(12) United States Patent
Tafas et al.

(10) Patent No.: US 7,471,079 B2
(45) Date of Patent: Dec. 30, 2008

(54) MICROSCOPE ENCLOSURE SYSTEM

(75) Inventors: Triantafyllos Tafas, Rocky Hill, CT (US); Yash Agarwal, New Haven, CT (US); Youngmin Kim, Wallingford, CT (US); Wei Guo, Unionville, CT (US); Richard Eberle, Wolcott, CT (US); Joseph Turgeon, Killingworth, CT (US); Michael Kilpatrick, West Hartford, CT (US); Petros Tsipouras, Madison, CT (US)

(73) Assignee: Ikonisys, Inc., New Haven, CT (US)

( * ) Notice: Subject to any disclaimer, the term of this patent is extended or adjusted under 35 U.S.C. 154(b) by 0 days.

(21) Appl. No.: 11/833,203

(22) Filed: Aug. 2, 2007

(65) Prior Publication Data

US 2008/0180794 A1    Jul. 31, 2008

Related U.S. Application Data

(60) Provisional application No. 60/821,544, filed on Aug. 4, 2006.

(51) Int. Cl.
*G01R 31/302* (2006.01)
(52) U.S. Cl. .................. 324/158.1; 324/750; 324/752
(58) Field of Classification Search .................. None
See application file for complete search history.

(56) References Cited

U.S. PATENT DOCUMENTS 5,475,316 A     12/1995  Hurley et al.
6,982,431 B2 *   1/2006  Modin et al. ............. 250/573

* cited by examiner

*Primary Examiner*—Minh N Tang
(74) *Attorney, Agent, or Firm*—Kelley Drye & Warren LLP

(57) ABSTRACT

A light-tight enclosure system, displaceable along a surface, for housing an automated microscope, having electronically controllable components and an image capturing device. The enclosure system may include device for displacement, a shelf for placement of the automated microscope, an externally viewable monitor, and a plurality of electrical power receptacles.

27 Claims, 24 Drawing Sheets

THE ENCLOSURE SUPPORT LEG

Display/Touch Screen

MICROSCOPE ENCLOSURE SYSTEM

CROSS-REFERENCE TO RELATED APPLICATIONS

This application claims priority from U.S. Provisional Application No. 60/821,544, filed Aug. 4, 2006.

BACKGROUND OF THE INVENTION

All references cited in this specification, and their references, are incorporated by reference herein where appropriate for teachings of additional or alternative details, features, and/or technical background.

1. Field of the Invention

The present invention generally relates to a microscope enclosure system.

2. Description of the Related Art

Generally, high-end microscopes are put into darkrooms to reduce interference with viewing due to ambient light. Such microscopes are often put on tables or desks with various computer, controllers and other components which are associated therewith. While such accommodations significantly aid in microscopy, the use of dark rooms suffers from disadvantages.

An initial disadvantage of any dark room is that it requires that the user of the room take time to adapt from the change from outside bright light to the dark light of the dark room, and when leaving the dark room from the dark light of the dark room to the bright outside light. Dark rooms also do not in themselves protect against dust, ambient contaminants, etc from interfering with the microscope images taken within the dark room. In fact, since many dark rooms are small in nature, it inadequate ventilation is available in the room, contaminants may actually build up in the dark room. Lastly, the fabrication and maintenance of a dark room may cost considerable money.

Dark rooms in themselves also do not protect microscopists against some of the hazards of microscopy. For example, microscopists frequently use microscopes that emit potentially hazardous emissions, such as UV radiation. Further, a microscopist may need to treat a sample with certain toxic metals or taggants. Although operators of a microscope under such conditions are often required to wear protective gear, such as glasses and gloves, operators are still often exposed to adverse levels of emissions and toxic materials.

U.S. Pat. No. 5,475,316 describes a emission microscope system that having an emission microscope mounted on a transportable isolation vibration table having a hole cut in the table, the emission microscope being enclosed by a light tight enclosure. The emission microscope is firmly attached to the isolation table but the enclosure is not, such that jostling of the enclosure does not vibrate the emission microscope. Samples to be viewed, which as described are semiconductor circuits, are placed on a tester head, which may also be held on a movable support structure. The tester head is designed to be able to be coupled to the isolation vibration table by docking the tester head to the hole in the table by way of a light-tight flexible silicone rubber collar which mechanically locks the tester head to hole. Such system proffers the advantage light tight viewing of samples in conjunction with ease of movement of the microscope. However, it may not protect users from all emissions given the enclosure not being sealed to the isolation table, and it requires exacting coupling of the tester head with the isolation table each time a sample is to be viewed. Further, as the sample is held on the tester head in an exposed condition until coupling is performed to the isolation table, the sample to be read may be contaminated with contaminants in the ambient environment.

To overcome the laborious process of manual microscopy, a number of researchers, including the present inventors, have proposed automated microscopy systems for capturing and analyzing multiple image views of a biological sample on a microscope slide or other sample retaining device (such as a multiple well plate). Such systems have the potential to greatly improve the efficiency of microscopic analysis and to remove some of the subjective inputs that affect microscopic analysis of a sample.

Because automated microscopy systems require a high degree of control of all of the functions traditionally manually effected in conventional microscopy, and likewise requires exacting control over the many parameters which may effect the recording of an image, such systems have heretofore been often relegated to a dark room. Working components of the microscope in the dark room are immobility fixed to stationary objects, such as tables and counters. Systems such as described in U.S. Pat. No. 5,475,316 have been not found to lend themselves to automated microscopy systems given the exacting anti-vibrational needs of conventional automated microscopy systems and the desirability of such automated microscopy systems to handle the sequential analysis of many samples.

SUMMARY OF THE INVENTION

Embodiments disclosed herein include the following:

In a first aspect, a light-tight enclosure is provided that is displaceable along a surface for housing an automated robotic microscope. The enclosure has electronically controllable components and an image capture device. The light-tight enclosure includes a) at least one compartment, wherein a lowest exterior surface of a lower compartment has rotatable means affixed thereto for displacement about the surface; b) at least one shelf interior to said enclosure, wherein said automated robotic microscope system is positionable on a shelf; c) a viewing monitor disposed in a surface of said enclosure viewable from a location exterior to said enclosure; and d) a plurality of receptacles mounted in a surface of said enclosure that transmit electrical power or electronic signals between an exterior surface and an interior surface of said enclosure.

In a further aspect, a integrated microscope system displaceable along a second surface is provided. The integrated microscope system includes an automated robotic microscope system housed in a light-tight enclosure. In this system, the automated robotic microscope system includes (i) a microscope having a stage; (ii) at least one specimen slide positionable on said stage; (iii) a light source that illuminates said slide; (iv) an image capture device that captures an image of said specimen; and (v) electrical, electronic and or computer-driven means communicating with and controlling positioning of said specimen slide, said light source, and said image capture device. Furthermore, in this system the light-tight enclosure includes (i) at least one compartment, wherein a lowest exterior surface of a lower compartment has rotatable means affixed thereto for displacement about the second surface; (ii) at least one shelf interior to said enclosure, wherein said automated robotic microscope system is positioned on a shelf; (iii) a viewing monitor disposed in a surface of said enclosure viewable from a location exterior to said enclosure; and (iv) a plurality of receptacles mounted in a surface of said enclosure and connected to components of said automated robotic microscope that transmit electrical power or electronic signals between an exterior surface and an interior surface of said enclosure.

In yet an additional aspect, embodiments of a method of capturing and displaying an image of a specimen on a specimen slide are provided. In such embodiments, the method includes
  (a) providing an integrated microscope system displaceable along a second surface comprising an automated robotic microscope system housed in a light-tight enclosure of the present invention,
  (b) displacing said robotic microscope system to a suitable position about said second surface;
  (c) causing a specimen slide to be reversibly positioned on said microscope stage;
  (d) illuminating said specimen slide;
  (e) capturing said image of said specimen slide, and
  (f) displaying said image on said monitor.

DETAILED DESCRIPTION OF THE INVENTION

There is provided herein an integrated microscope within a light-resistant disclosure. In particular there is provided in an embodiment, an automation robotic microscope system in a light-tight enclosure positioned on movable fixtures, such as casters. Such embodiments allow for the microscope to be easily moved, and allows the microscope to work in a dark environment once the enclosure door is closed. The enclosure may further be manufactured from materials that help block harmful UV and other radiation.

In one embodiment, the enclosure further includes a filtering system that allows for the enclosed microscope to work in a clean environment.

In another embodiment, the enclosure is designed such that a surface of the enclosure that is not internal to the enclosure provides for a monitor affixed thereto, that permits viewing of information pertaining to the samples being viewed with the enclosure by the microscope system. Optionally, such monitor may include a touch screen that allows functionalities (e.g., number of slides read per minute, the type of filter to be employed in a test, a typewriter keyboard, etc.) of the microscope system within the enclosure to be controlled by the touch screen.

Figure 13:
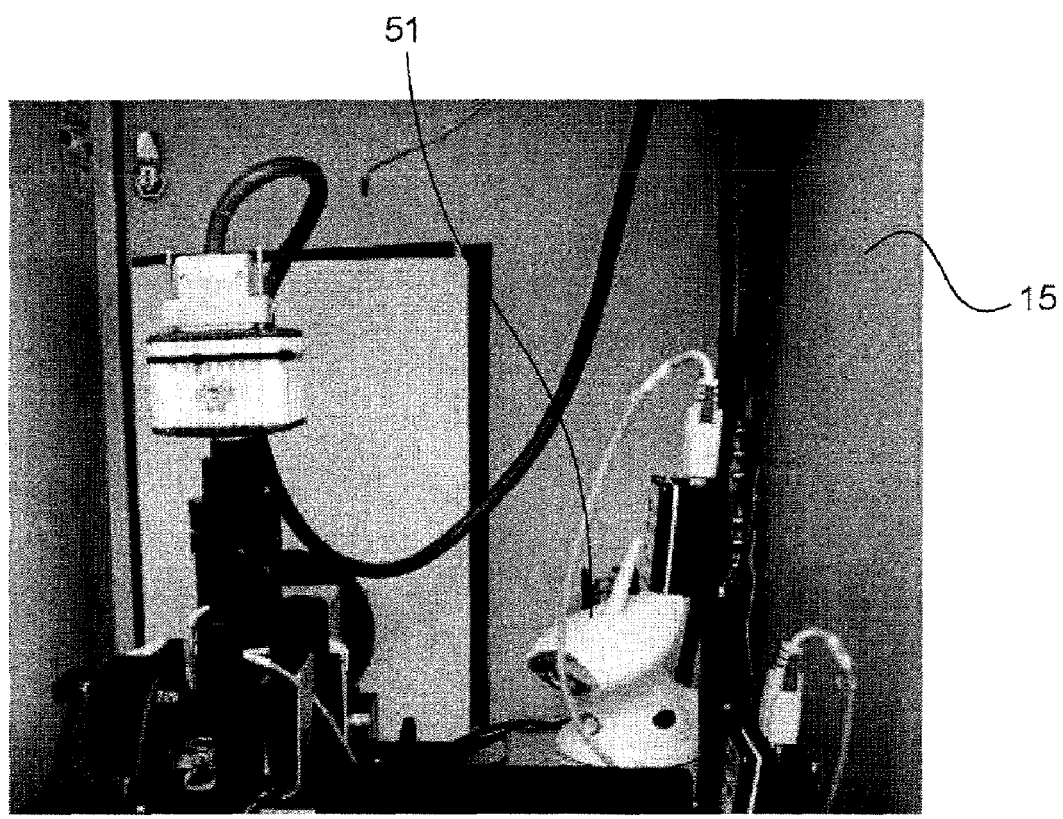
FIG. 13. Partial view of an embodiment of an interior of enclosure.

In another embodiment there is disclosed an enclosure system comprising at least two separate compartments, each of which may have a door allowing for access into the compartment. In one such type of enclosure system, the system comprises a compartment housing a microscope assembly comprising numerous parts such as a QC Camera (51 of FIG. 13) under the control of instrumentation housed in another compartment. The QC camera may be used to survey the operation of components of the automated microscope system while the compartment is closed.

The compartment housing the microscope may be light-tight to prevent both ambient light from interfering with imaging and to prevent the leakage of any emissions used in the imaging process from leaking into the environment ambient to the compartment.

Figure 16:
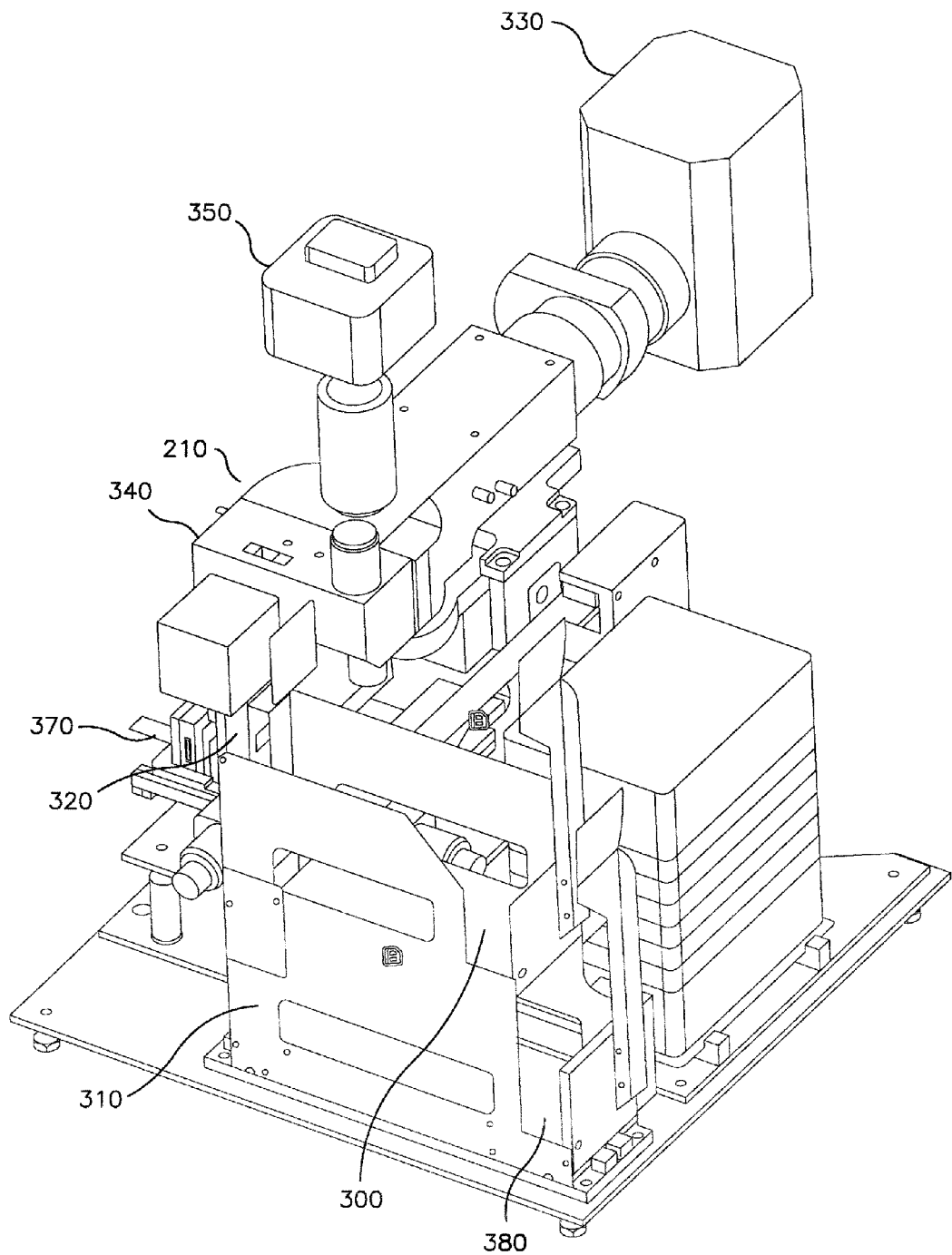
FIG. 16. Isometric view of an embodiment of an automated microscope assembly.
Figure 17:
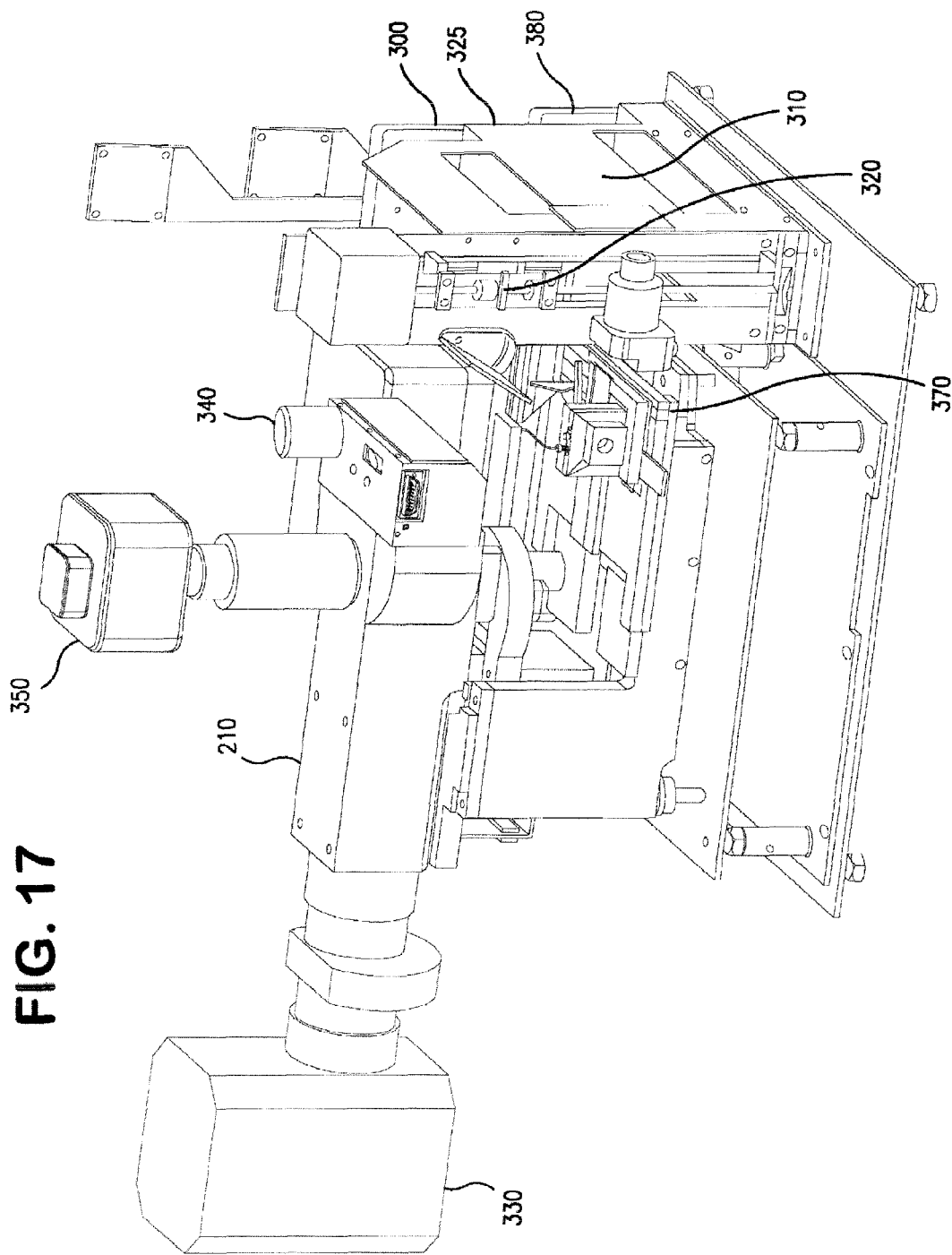
FIG. 17. Isometric view of an embodiment of an automated microscope assembly.
Figure 18:
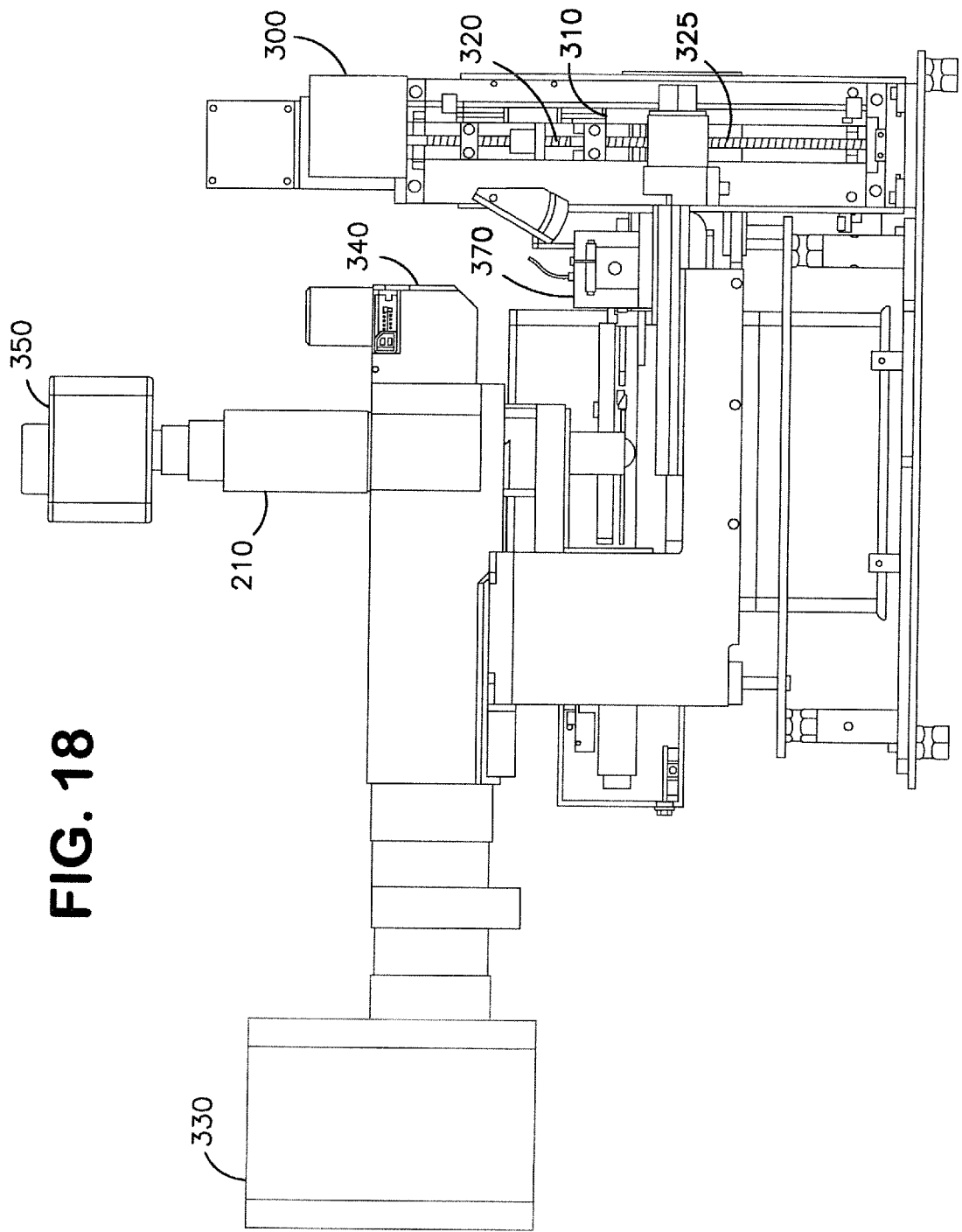
FIG. 18. Side elevation view of an embodiment of an automated microscope assembly.
Figure 19:
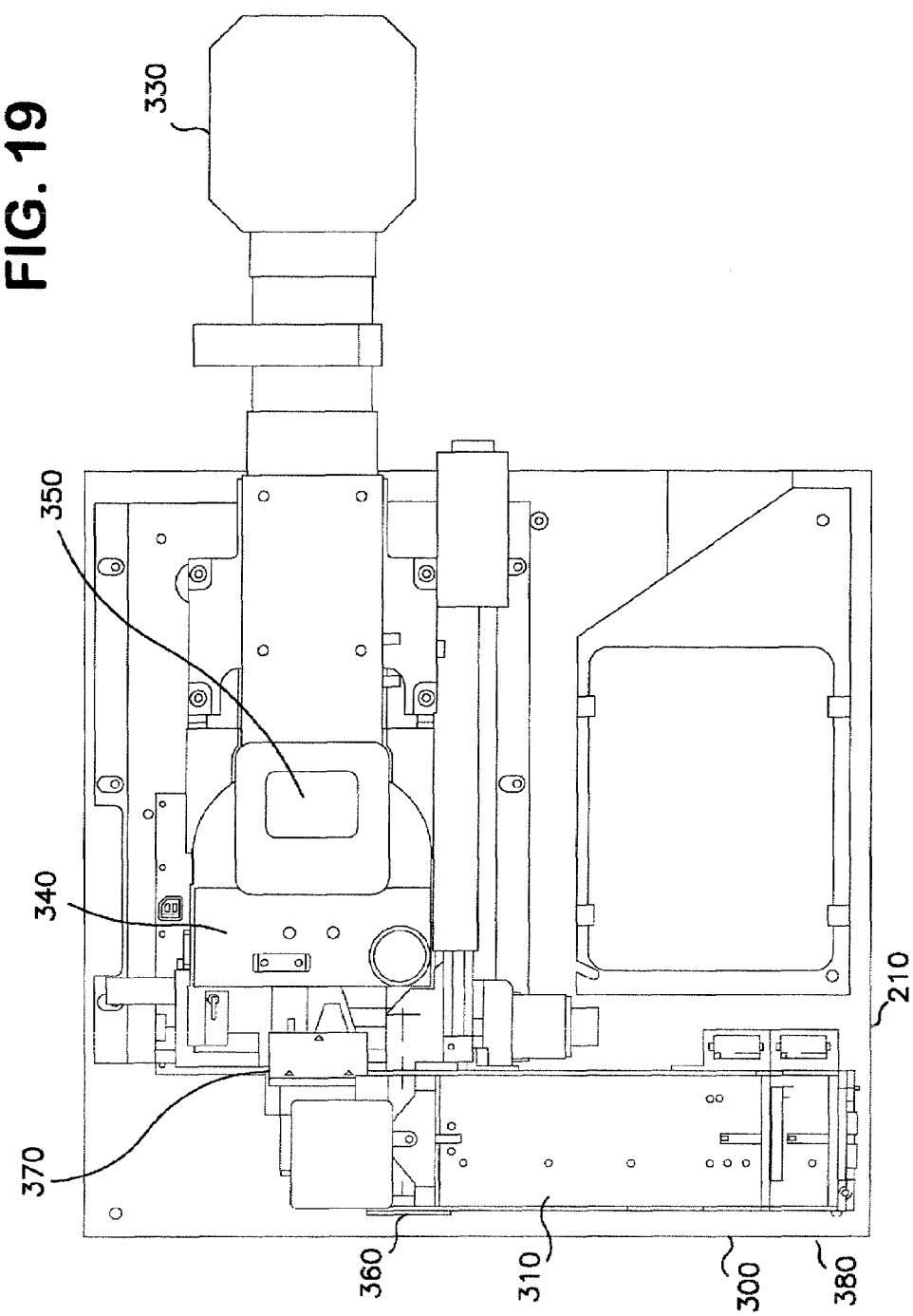
FIG. 19. Top view of an embodiment of an automated microscope assembly.

An embodiment of an automated microscope assembly 210 is shown in FIGS. 16 and 17, two isometric views, FIG. 18, a side elevation view, and FIG. 19, a top view. Microscope specimen slides are loaded into cassettes which are then loaded into input port 300 of the microscope system. Identification data (ID) is read from a cassette barcode tag. Alternatively, RFID tags, or other equivalent means, such as electromagnetically readable information, may be employed for the ID data. A magnetic sensor detects the presence of a cassette. In certain embodiments a conveyer belt transports the loaded cassettes from the input port to an elevator sub-assembly 310. Elevator sub-assembly 310 is comprised of a hook-like attachment fixture 320 which rides up or down on motorized lead-screw 325. Attachment fixture 320 engages a receptor slot on the cassette, which permits the cassette to be raised or lowered. The cassette is then lowered to a position suitable for accessing the first microscope slide contained in the cassette.

A feeder arm assembly inserts feeder arm 360 into the cassette, immediately above the slide selected for removal. The slide holder, which is mounted on microscope stage 370, is moved by stage 370, into position, in line with the slide. The movement of the slide holder, into place, causes a thin wire, with a bend at each end, to rotate by 90 degrees thereby configuring a hook which protrudes vertically downward from the forward edge of feeder arm 360. When feeder arm 360 subsequently retracts, the wire hook pulls the slide onto the slide holder. Stage 370 movement causes the feeder arm wire to again rotate thereby retracting the previously deployed hook at the forward edge of feeder arm 360 and simultaneously deploying a similar hook at the rear edge of feeder arm 360.

Stage 370 then positions the slide holder so that the specimen slide is in the field of view of the microscope. The specimen slide is illuminated, in the reflection mode, by light source 330, by means of a right angle prism or mirror. The desired wavelength filter is selected by motorized carousel 340 and placed in the optical path. Camera or imaging device 350 captures an image. Microscope stage 370 repositions the slide and/or another filter is selected, as required by the protocol, and additional images are captured. When all of the required images have been captured, microscope stage 370 returns the slide to its reloading position immediately in front of the cassette slot.

The feeder arm assembly inserts the feeder arm 360 into the cassette, as before. In an embodiment, the now deployed rear hook pushes the slide back into its cassette slot as feeder arm 360 is extended. In an alternative embodiment, a cam/slide pusher block under the feeder arm assembly pushes the slide into the cassette. Feeder arm 360 then retracts and the cassette is moved by the elevator sub-assembly 310 to position it for access to the next slide. The removal/examination/return process is repeated until all of the slides have been examined.

The cassette is then moved to the lower level by the elevator sub-assembly, where it is decoupled from the hook-like attachment fixture 320. A conveyer belt transports the cassette to the output port 380.

In one embodiment, the compartments are stacked one on another and attached to each other through affixing devices (e.g., screws, bolts, welds, etc.). By including rotatable mechanisms, such as wheels or casters, on the bottom surface of the lowest compartment, the joined compartments may be moved in conjunction with each other easily upon a floor. If casters are used, the casters may be fully lockable, with the wheels and vertical pivot being locked in conjunction. In such embodiment, there may be included an anti-fall support leg attached to the bottom compartment face which faces the floor upon which the structure rests. The anti-fall support leg may comprise a angled piece of material which may be caused to jut out from the lower compartment. Such support leg may be operatively configured to have a portion thereof to be slideable the bottom surface of the lower compartment to allow for extension and retraction of the anti-fall support leg. The anti-fall support leg may reduce the risk of interconnected stacked compartments tipping over.

Figure 1:
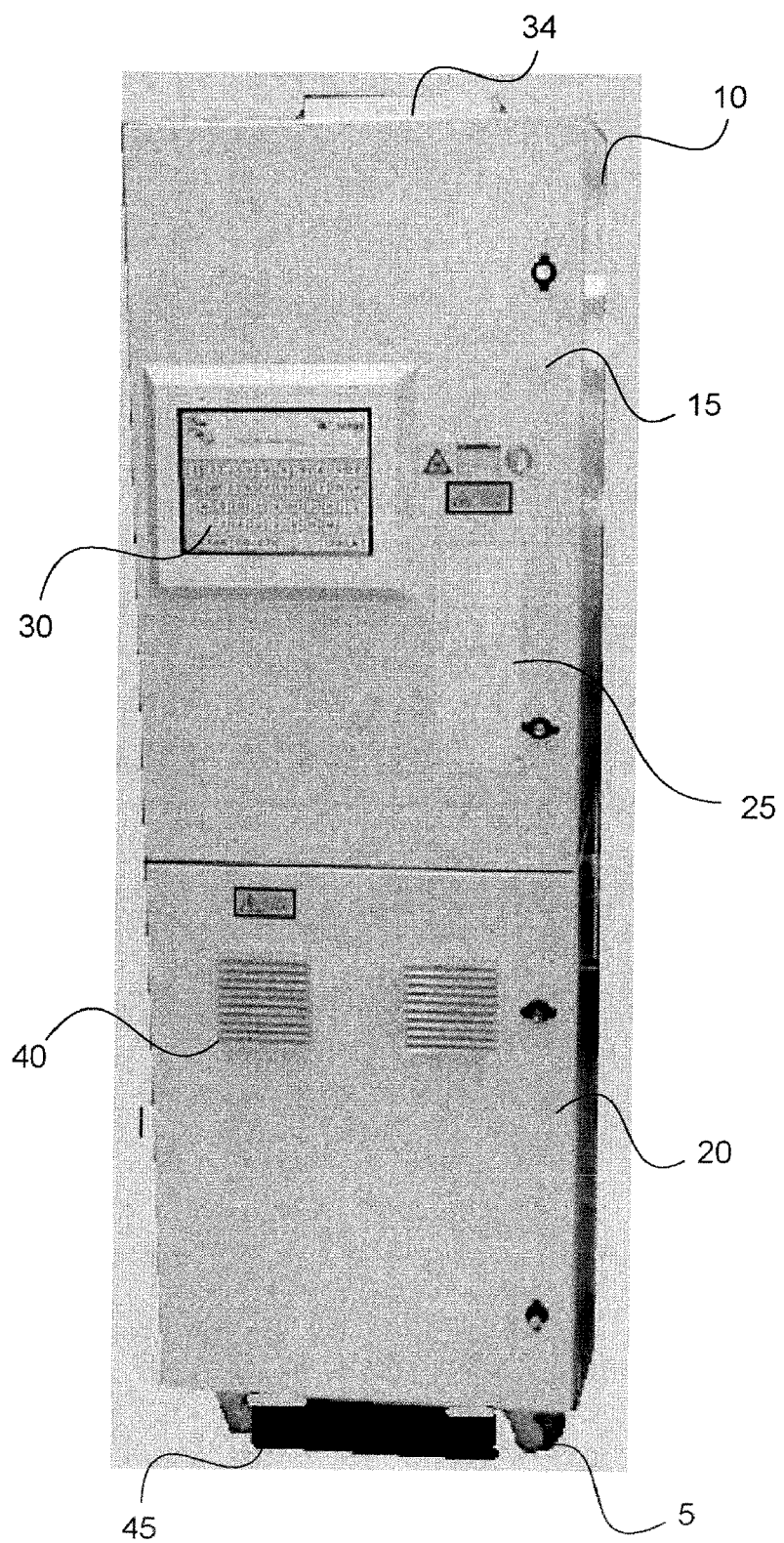
FIG. 1. Exterior view of an embodiment of a microscope enclosure compartment.

Turning to FIG. 1, there is shown an exemplary embodiment of a compartment assembly 10 of the present invention. Such system comprises an upper compartment 15, and a lower compartment 20.

Figure 6A:
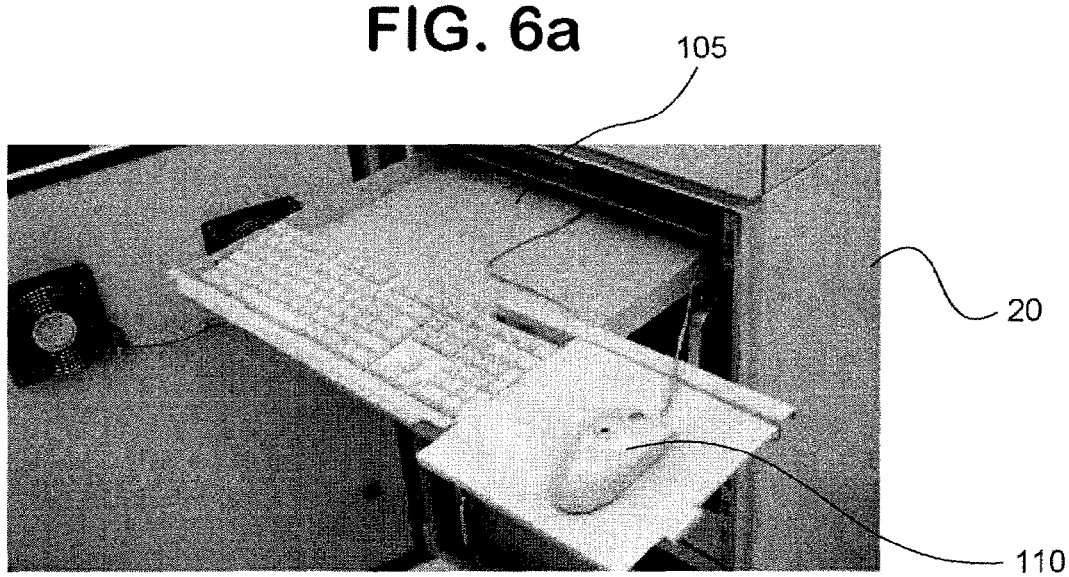
FIG. 6, panels a and b. Partial views of an embodiment of a microscope enclosure compartment showing a slideable shelf that accommodates computer peripheral devices.
Figure 6B:
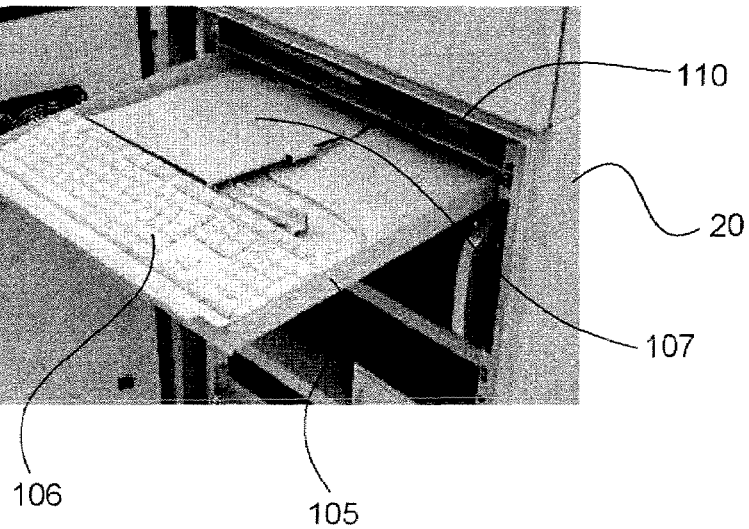

Lower compartment 20 includes fan vents 40 and has attached at the underside of the compartment casters 5 allowing the compartment assembly 10 to be movable upon the floor. Lower compartment 20 as depicted further includes a anti-fall support leg 45 which is housed on the underside of the lower compartment 20 and which is extendable therefrom to an extended position wherein a portion of the anti-fall support leg rests on a floor portion distal from the lower compartment so as to provide support for compartment assembly 10. As shown in FIGS. 6a and 6b, lower compartment 20, may include devices useful for providing instruction to automated microscope via input means such as mouse 110, and keyboard 105. A foldable and extendible mouse table 107 may be included.

Figure 3:
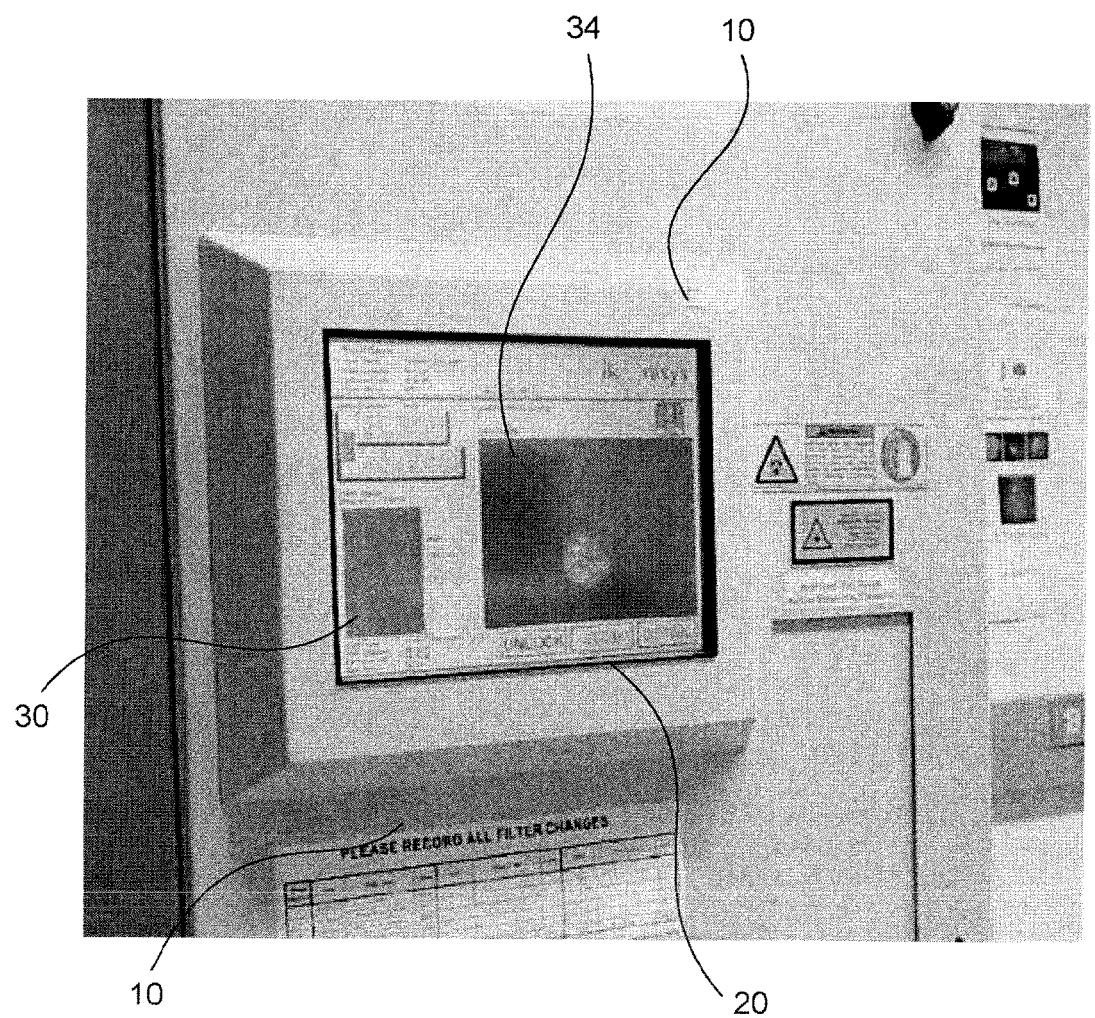
FIG. 3. Partial exterior view of an embodiment of a microscope enclosure compartment including touch-sensitive monitor screen.
Figure 14:
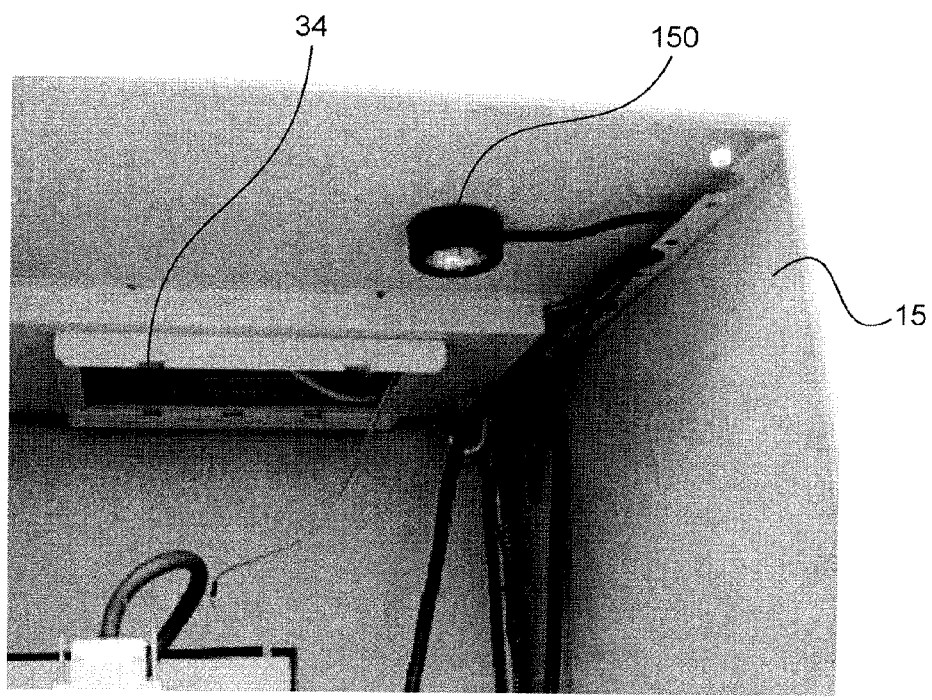
FIG. 14. Partial view of an embodiment of an interior of enclosure.
Figure 15:
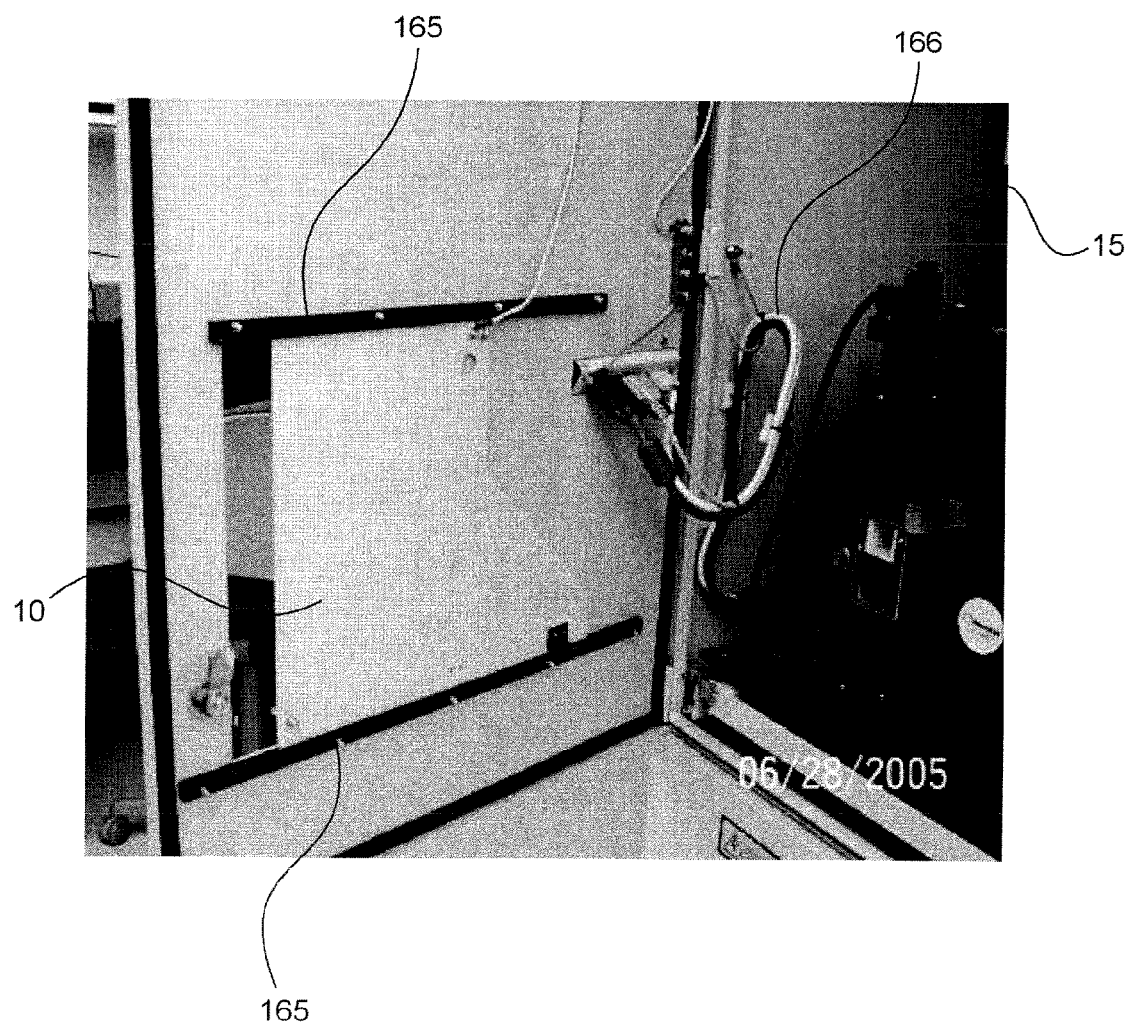
FIG. 15. Partial view of an embodiment of an interior of enclosure.

Upper compartment 15 is shown to include air filter system 34 (shown internally in FIG. 14) helping to keep equipment within the compartment clean and cool, and display monitor 30 through which image displays may be viewed and/or instructions with respect to the microscope housed within the compartment may be entered. An exemplary display monitor 30 is shown at FIG. 3, wherein the monitor includes image window 34, instructions 20, and image enhancement window 30 as well as other information thereon. Input may be by touch of respective sections. Upper compartment 15 is further shown to include a small slideable door (10) for putting in or taking out cassettes containing a plurality of microscope slides in a manner without causing disturbance of the image scanning. An exemplary slideable door (10) from the inside compartment is shown at FIG. 15. As illustrated in FIG. 15, the slideable door (25) may interface with a parallel set of grooved runners 165, 165' allowing the slideable door (10) to be moved along the runners. FIG. 15 also shows an exemplary connection (166) set up for monitor 30. Upper compartment 15 may further include cooling apparatus, such as fans connected to fan ducts 40' of FIG. 8 and lights, such as shown at 150 of FIG. 14.

Figure 2:
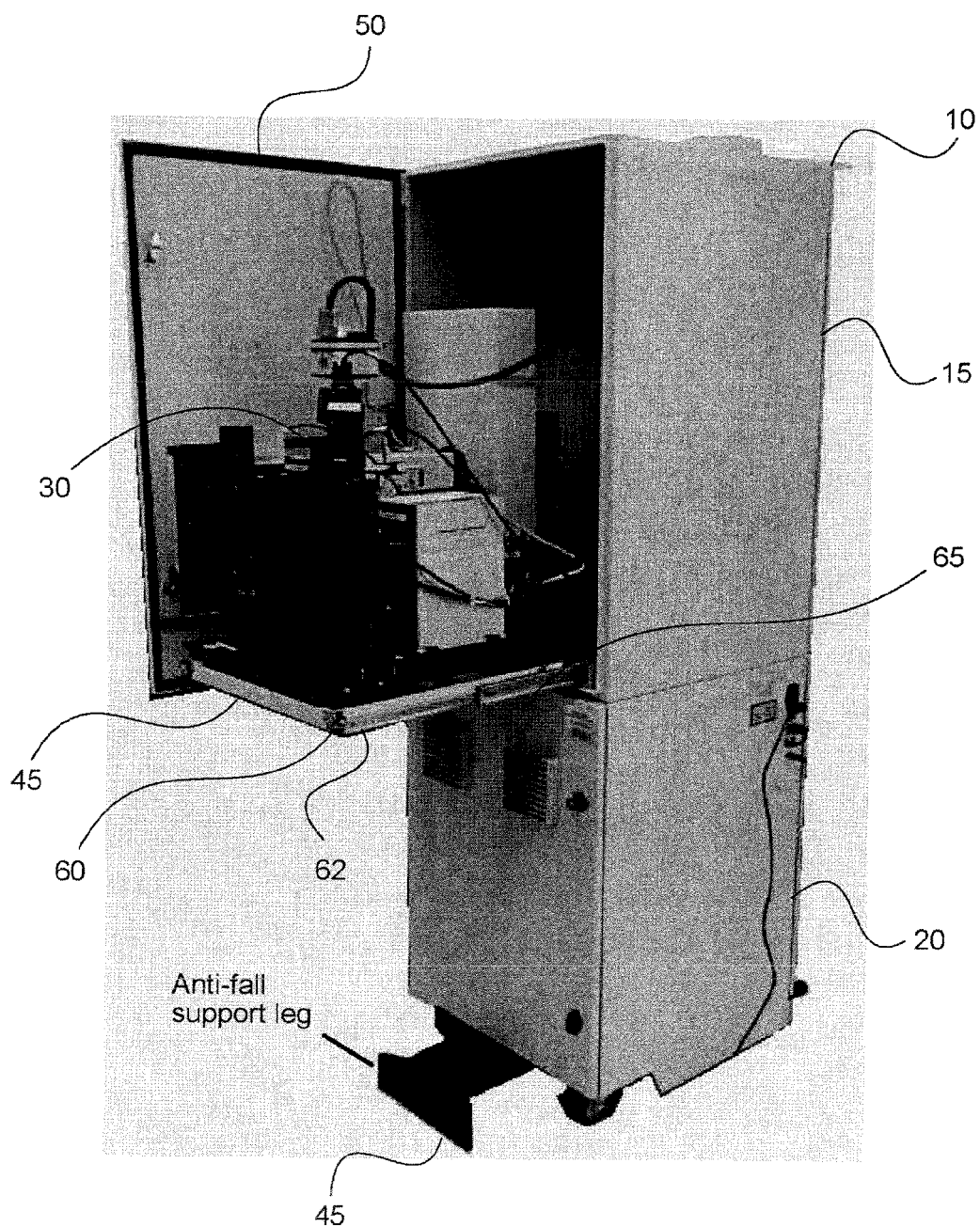
FIG. 2. View of an embodiment of a microscope enclosure compartment opened and showing slideable shelf with a microscope assembly thereon.
Figure 4:
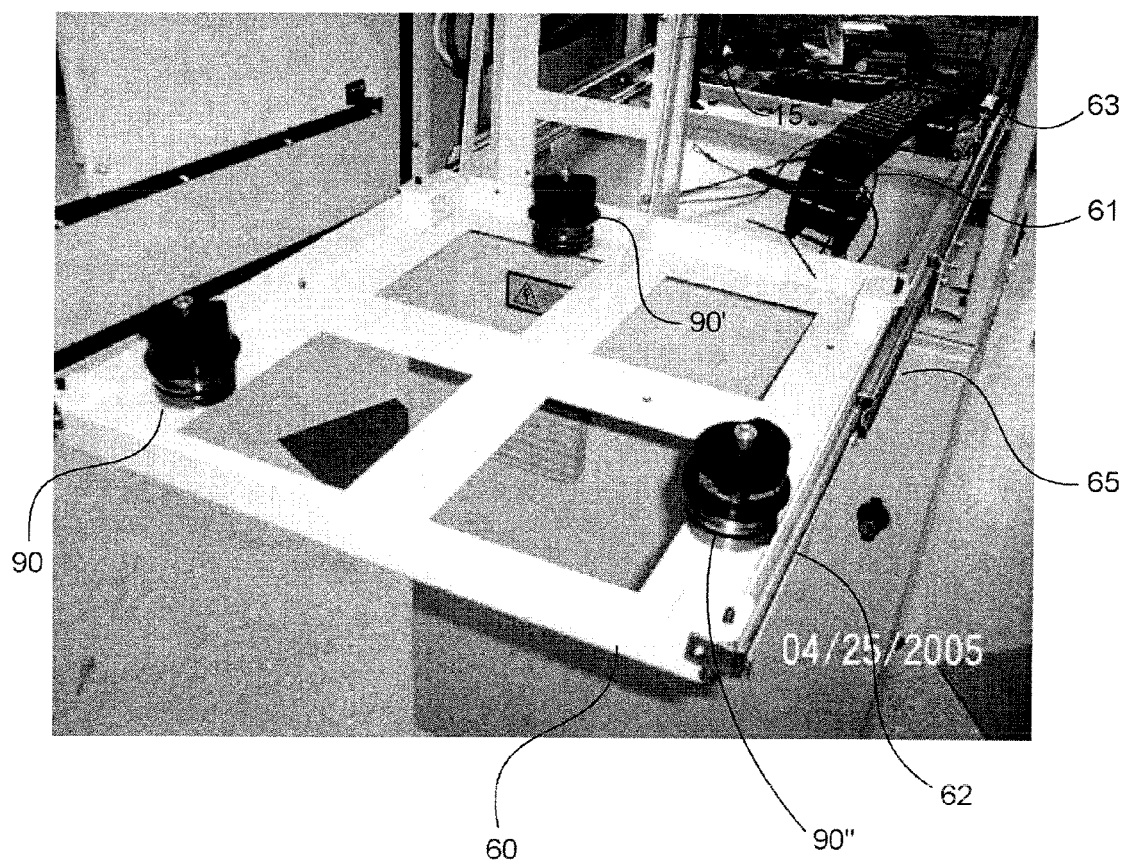
FIG. 4. View of an embodiment of a slideable shelf including vibration isolation supports.
Figure 9:
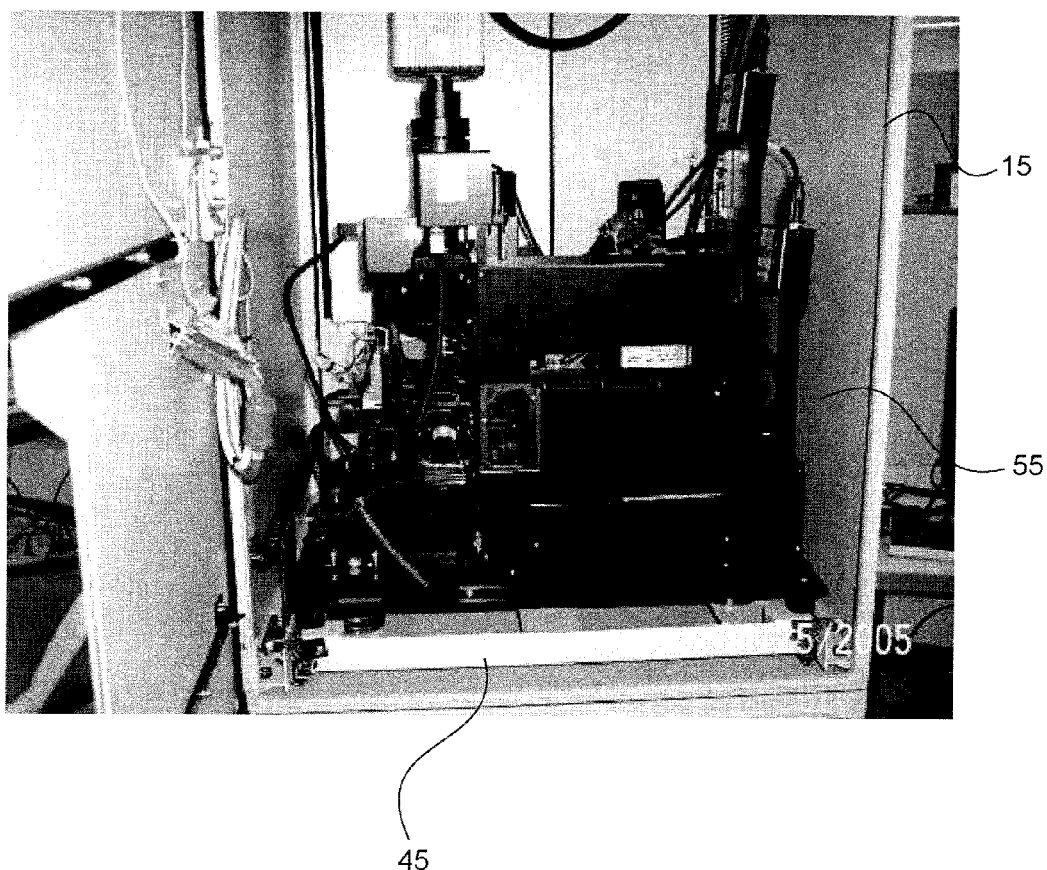
FIG. 9. Partial view of an embodiment of an interior of enclosure with microscope.

The compartment (15) housing the microscope assembly (55) may include a slideable shelf (45) positioned within the compartment upon which the microscope may rest (see FIG. 9). The slideable shelf permits the microscope to be slid into and out of the compartment. FIG. 2, illustrates an exemplary slideable shelf 60 supporting a microscope assembly 45 found within upper compartment 15 of a compartment assembly 10 further comprising lower compartment 20 and accessible via door 50. Slideable shelf 60 is shown to include a slideable runner 62 which slides within extendible support 65. The slideable shelf may include a number of vibration isolation bearings as shown, for example, in FIG. 4 positioned in a manner to reduce vibration of the microscope due to ambient vibration forces, allowing for increased stability and quality of images. As illustrated in FIG. 4, slideable shelf 60 may include thereon vibration isolation bearings 90, 90', 90" which are operatively configured to reduce any vibrations reaching the microscope during operation to increase the stability and quality of images when unexpected impacts are provided to the compartment assembly 10. The slideable shelf may be interlinked by a linking mechanism (such as, without limitation, a pulley system) operatively configured to cause an anti-fall support leg to slide from under the bottom surface of the compartment facing the floor when the slideable shelf is pulled out of the compartment holding the microscope. In such manner the anti-fall support leg reduces the risk of tipping when the microscope on the slideable shelf is jutting out of its compartment.

Figure 5:
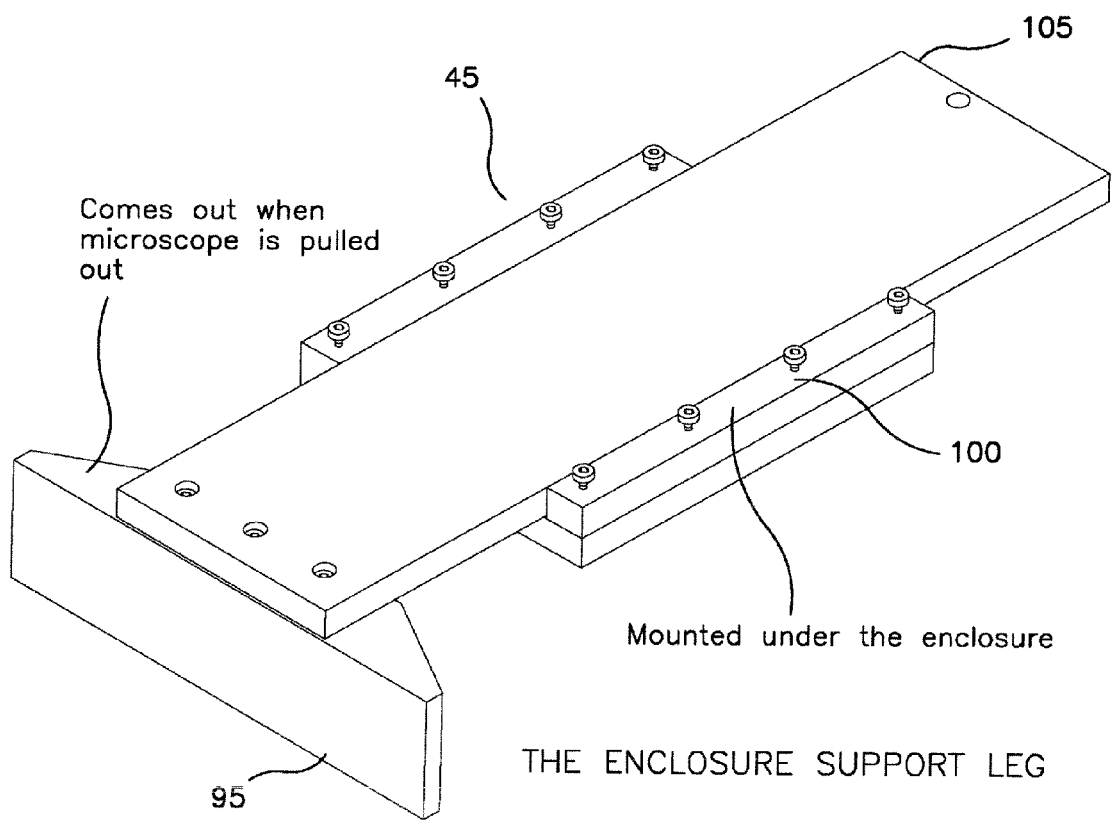
FIG. 5. View of an embodiment of an anti-fall support leg.

As shown in FIG. 2, anti-fall support leg 45 is extendible upon movement of slideable shelf 60 out of upper chamber 15. Anti-fall support leg 45 is storable under the lower surface of lower compartment 20 due in part to clearance provided by casters 70. An exemplary anti-fall support leg 45 is illustrated at FIG. 5, wherein there is shown a leg comprising a support portion 95 that is operatively configured to rest on the floor on which compartment assembly 10 is placed when anti-fall support leg is in an extended position, such as fully extended. Anti-fall support leg further includes a compartment slide portion 105 which is operatively configured to rest under the lower compartment of the compartment assembly between slidably supports 100. Anti-fall leg may in one embodiment be engaged outwardly without the need for slideable shelf 60 to be pulled out.

Figure 8:
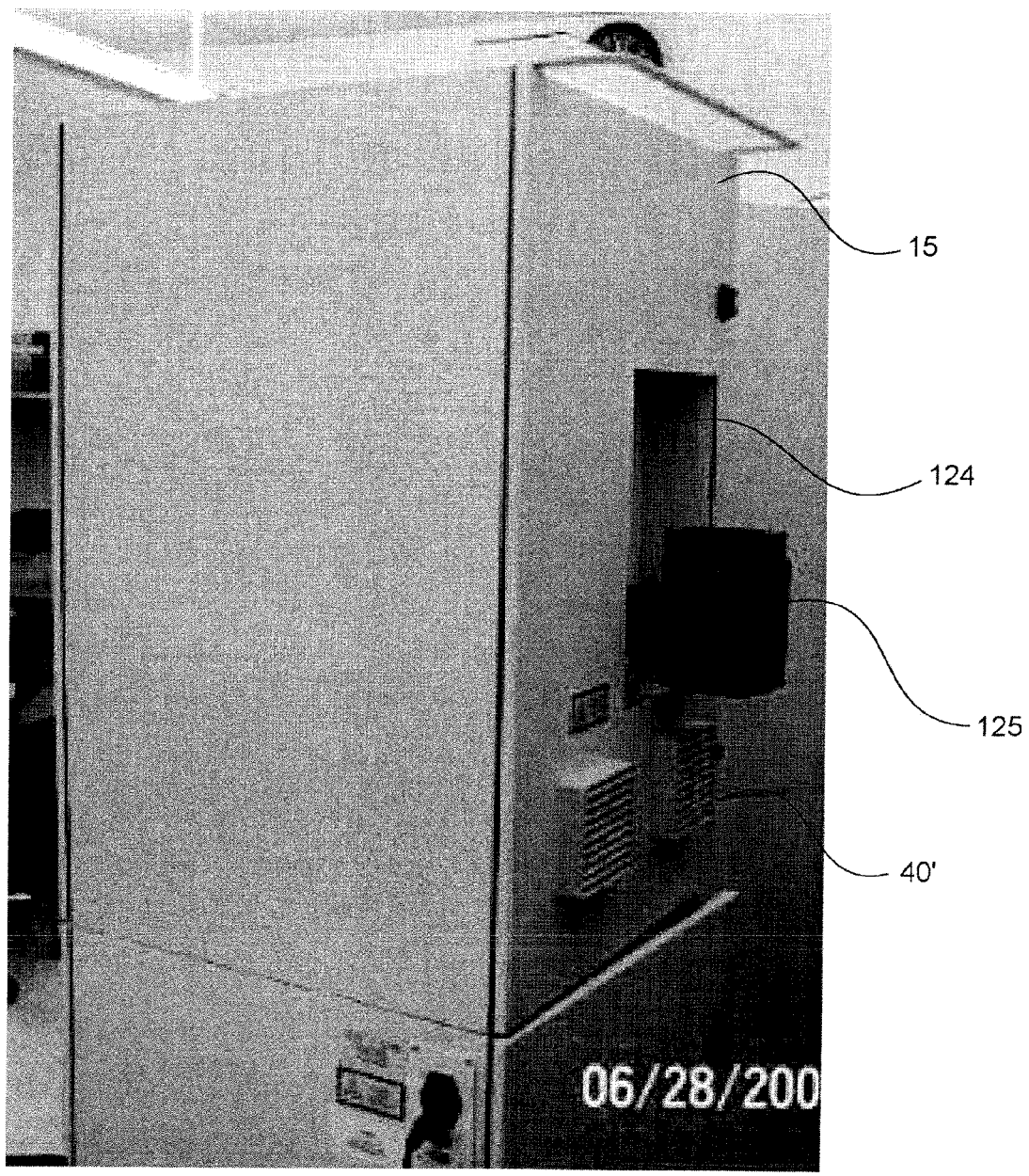
FIG. 8. Partial exterior view of an embodiment of a microscope enclosure compartment.
Figure 11:
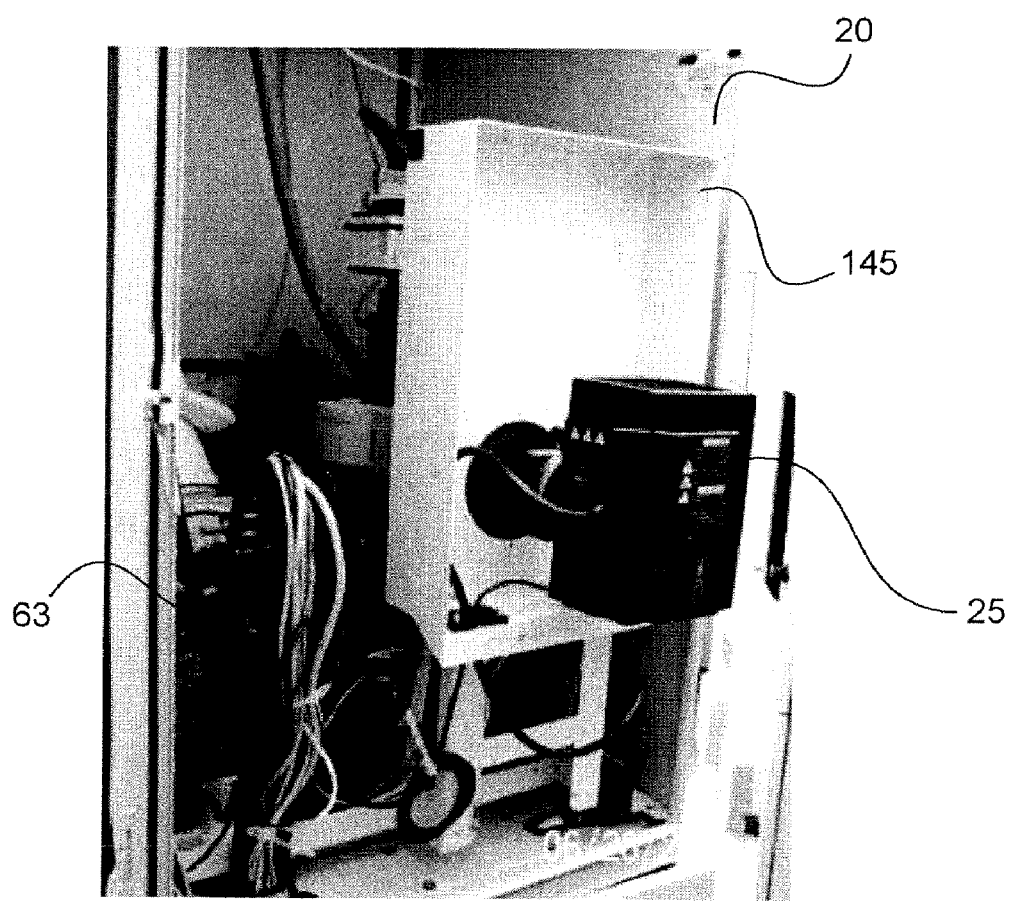
FIG. 11. View of an embodiment of an emission lamp.
Figure 12:
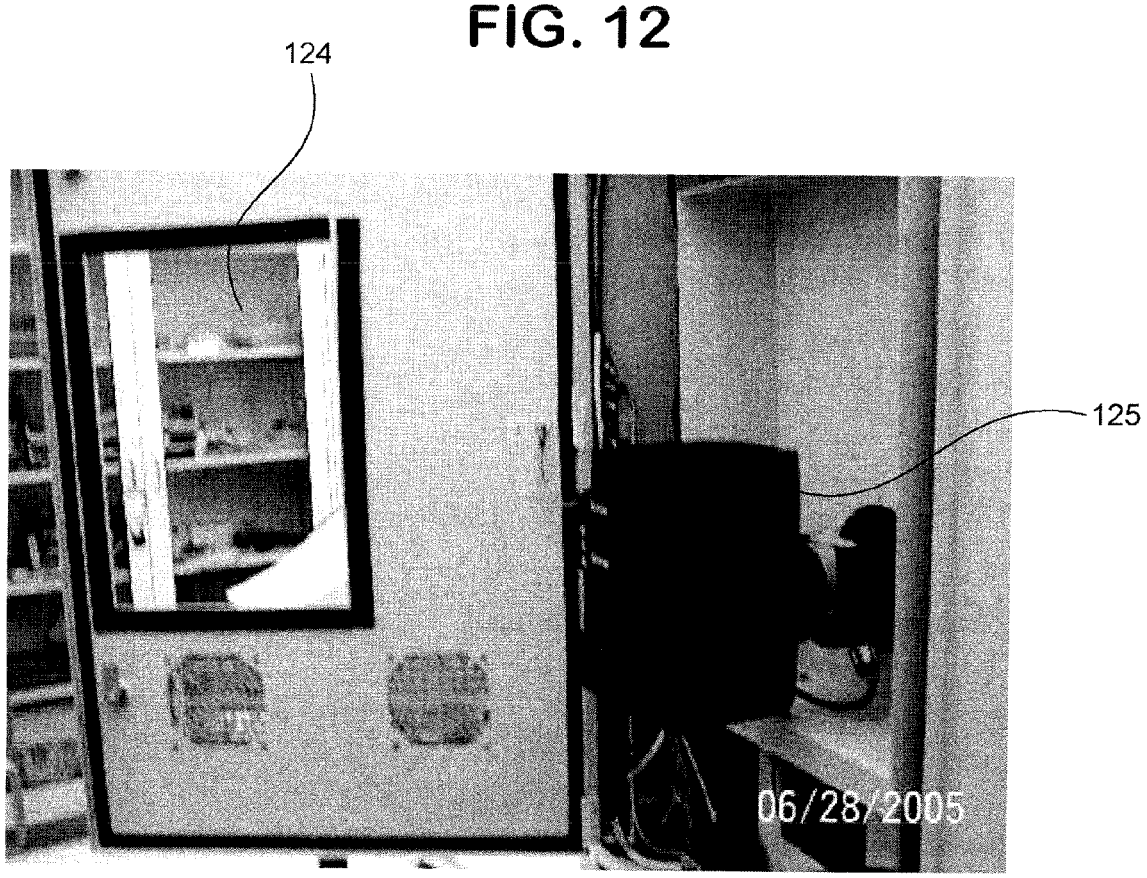
FIG. 12. View of an embodiment of an emission lamp housing and a portion of the microscope enclosure.

The slideable shelf may include a flexible cable rail 63 as demonstrated in FIG. 4 that holds the cables attached to the microscope such that the cables do not become entwined when the slideable shelf is moved inward into the compartment and outward from the compartment (see, also FIG. 11). As would be understood by one of ordinary skill in the art, certain components of the microscopy system, such as portions of the emission source (e.g., lamp 125 as shown in FIG. 8) may be configured so as to extend outside of the compartment housing the microscope so long as a light-tight enclosure about objective and sample is maintained. For example, lamp 125 as shown in FIG. 8 extends outside of upper compartment 15 through an opening 124. Extension of the lamp outside may be advantageous if allowing heat to be expended into the cabinet environment rather than into the upper chamber. As shown in FIG. 11, lamp 125 protrudes into upper compartment 20 via a housing 145 which is designed to interface with light closure material 124 of FIG. 12 such that a light seal is made between housing 145 and the light closure material 124.

Figure 10:
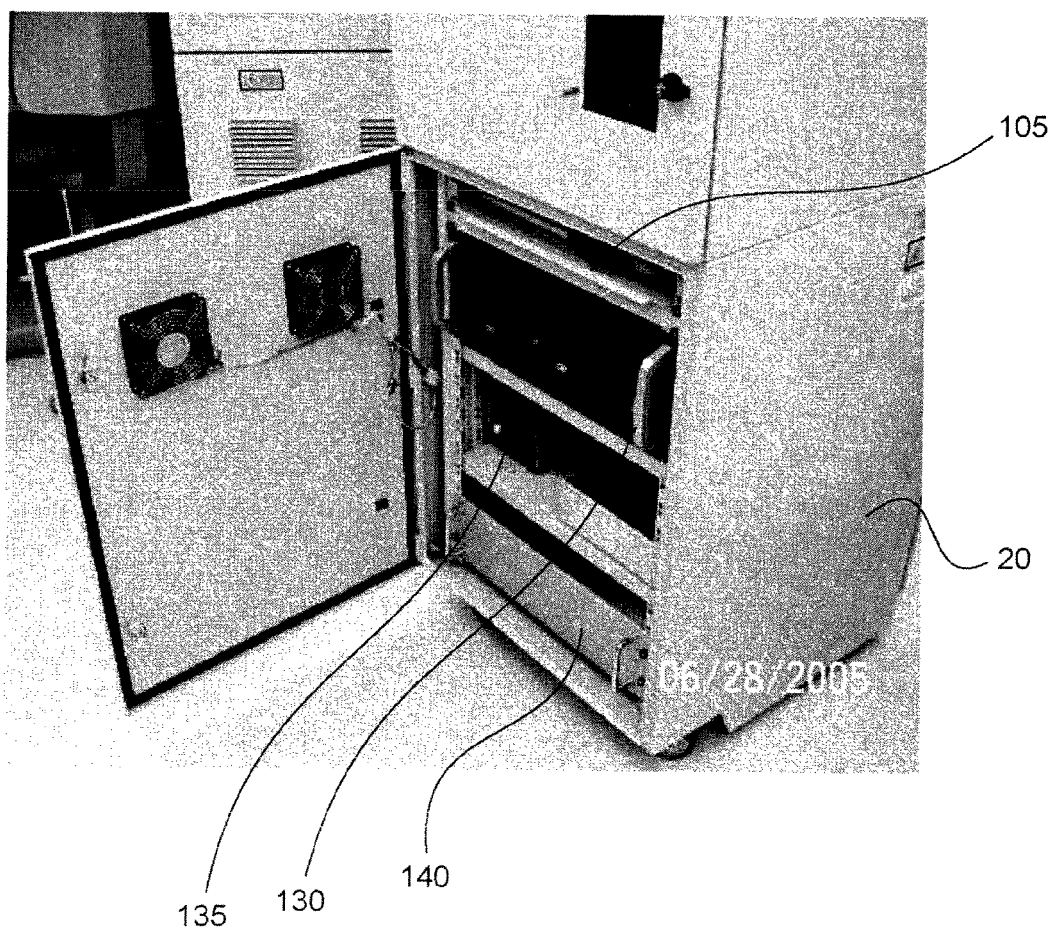
FIG. 10. Partial view of an embodiment of an enclosure showing a compartment housing various electronic and control devices.

A compartment housing control devices (20) for the microscope may comprise instrumentation for storing data, processing data, or any other type of control device (130, 135, 140 of FIG. 10). For example such compartment may also include as shown in FIGS. 6a and 6b, slideable shelf (105) that houses keyboard (106), mouse (110), and mouse pad table (107) which may be operatively configured to be extendable from the slideable shelf.

Figure 7:
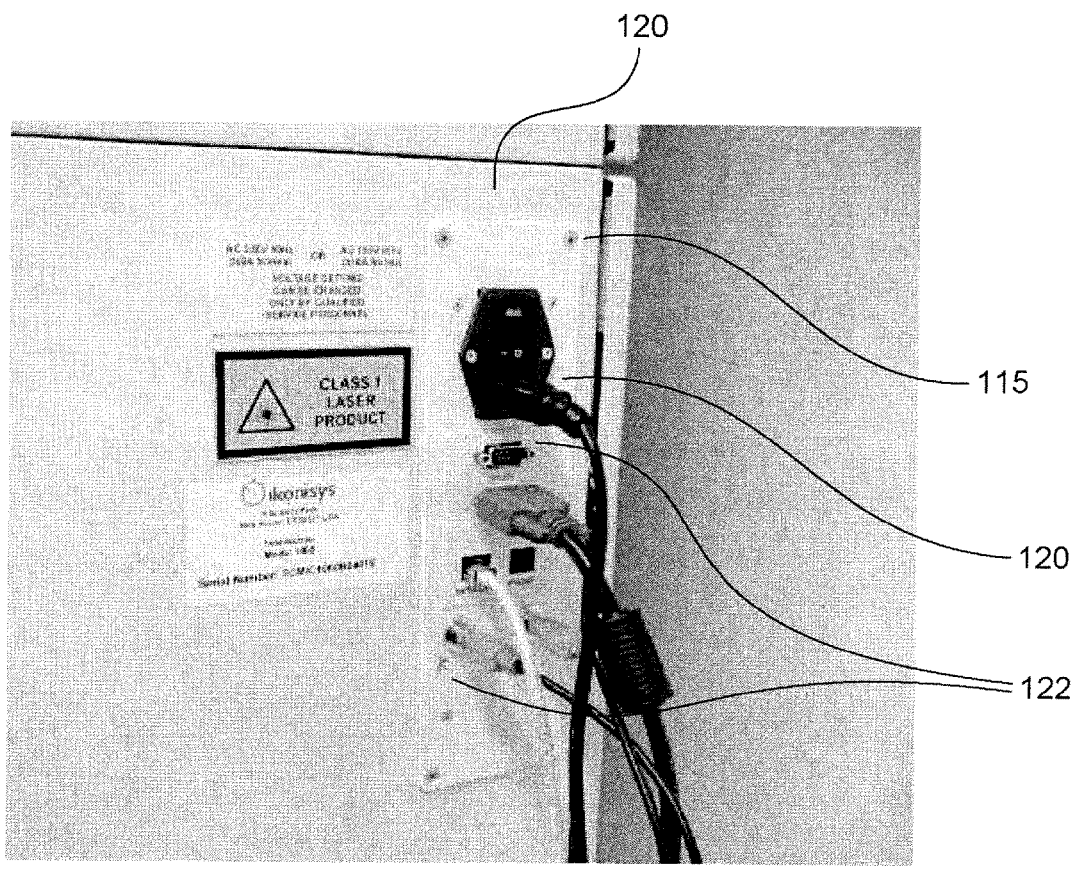
FIG. 7. Partial exterior view of an embodiment of a microscope enclosure compartment showing electrical and electronic receptacles.

One or more compartments may comprise power panel 115, as depicted in FIG. 7, preferably on the outside of the compartment. The power panel may include outlets such as a power outlet 120, a network outlet, a phone outlet, a USB outlet, VGA outlet, and keyboard outlet 122. One or more compartments may comprise internally or externally devices such as fans, filters, and lights. The doors of compartments may include therein sliding doors which allow for easy access into the compartment without the need to open the entire door, allowing for minimally invasive entrance into the compartment with the minimal of ambient light entrance into the compartment.

Figure 20:
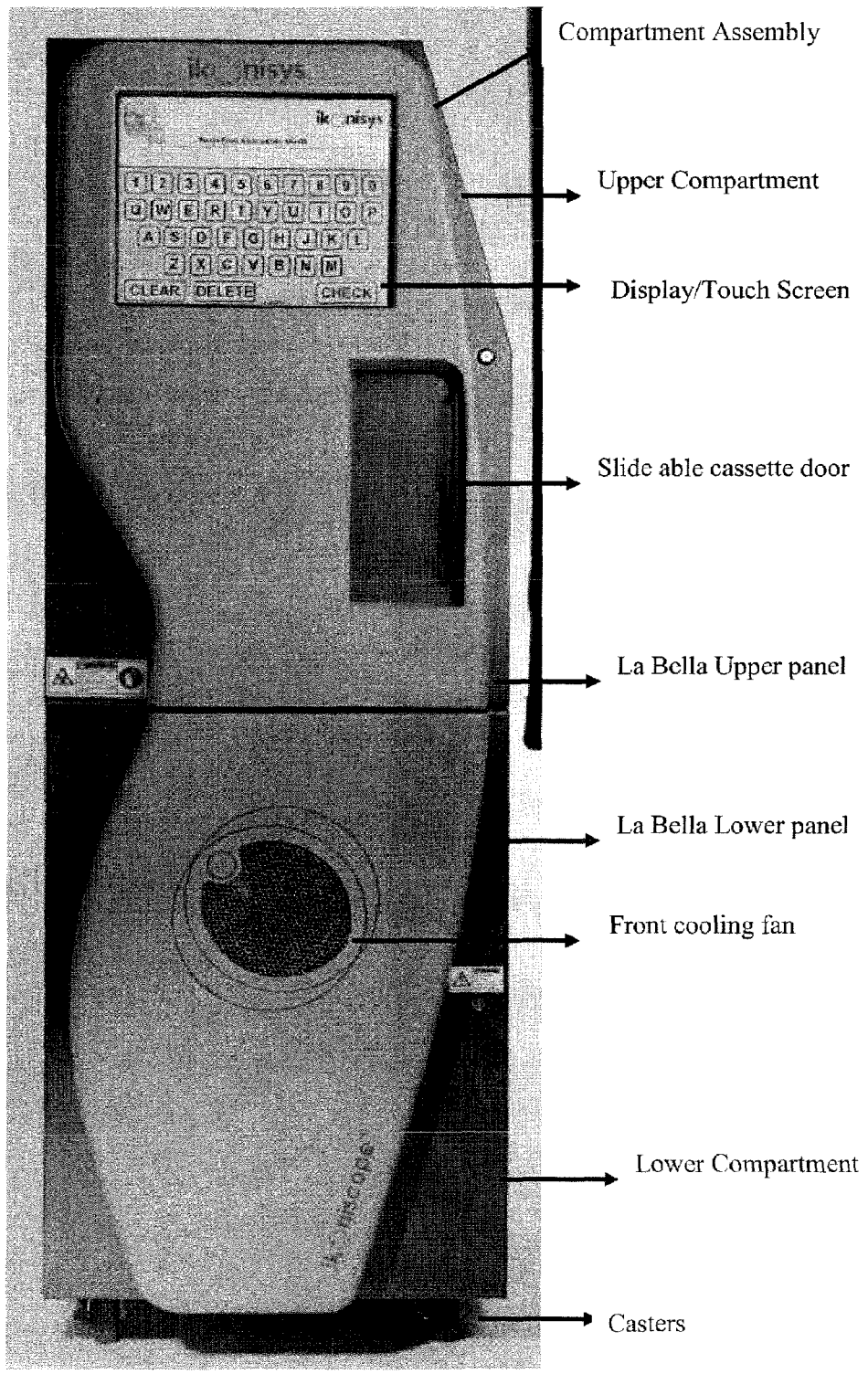
FIG. 20. Overall view of an embodiment of an enclosure, from the front.
Figure 22:
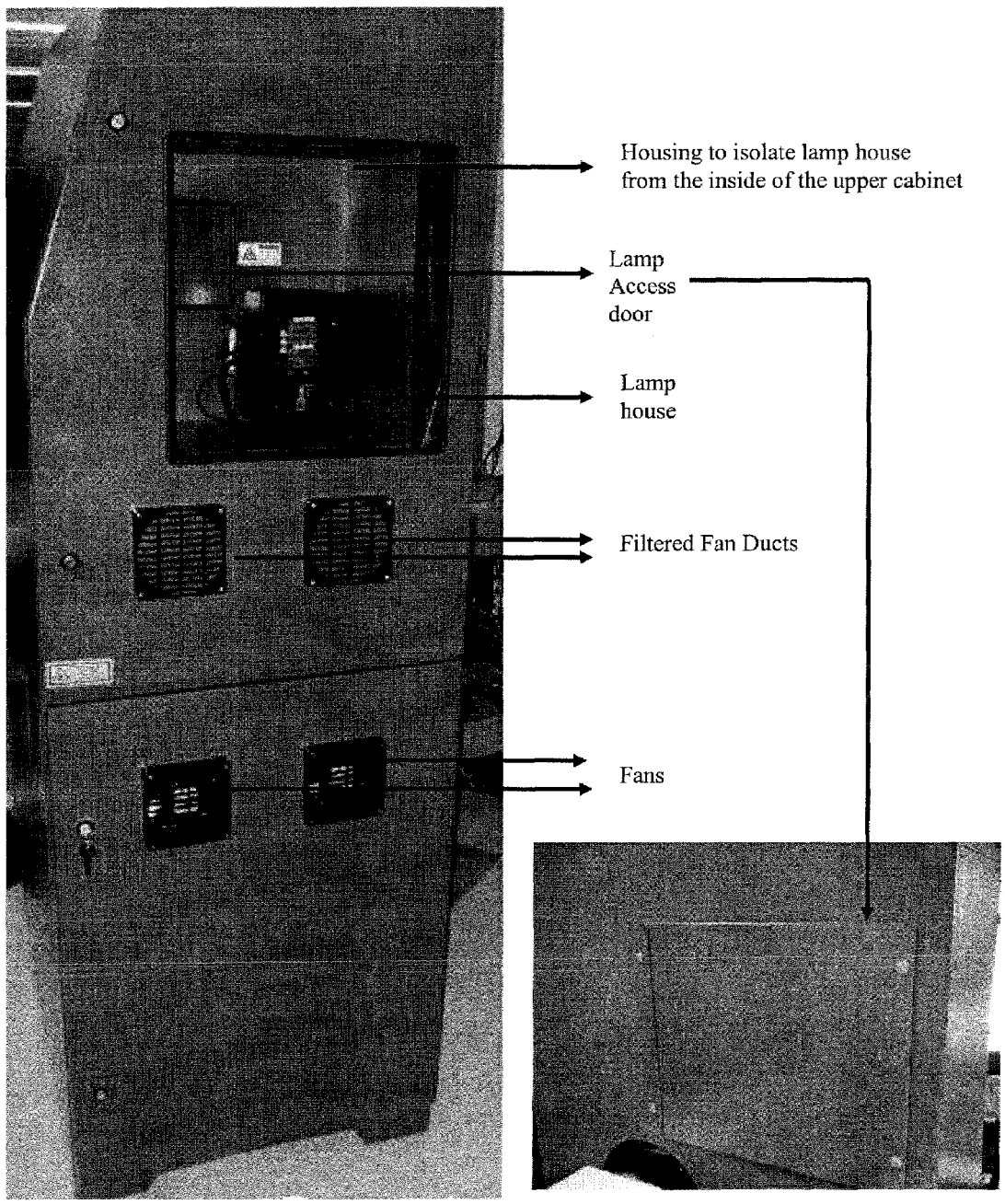
FIG. 22. Overall view of an embodiment of an enclosure, from the rear.
Figure 23:
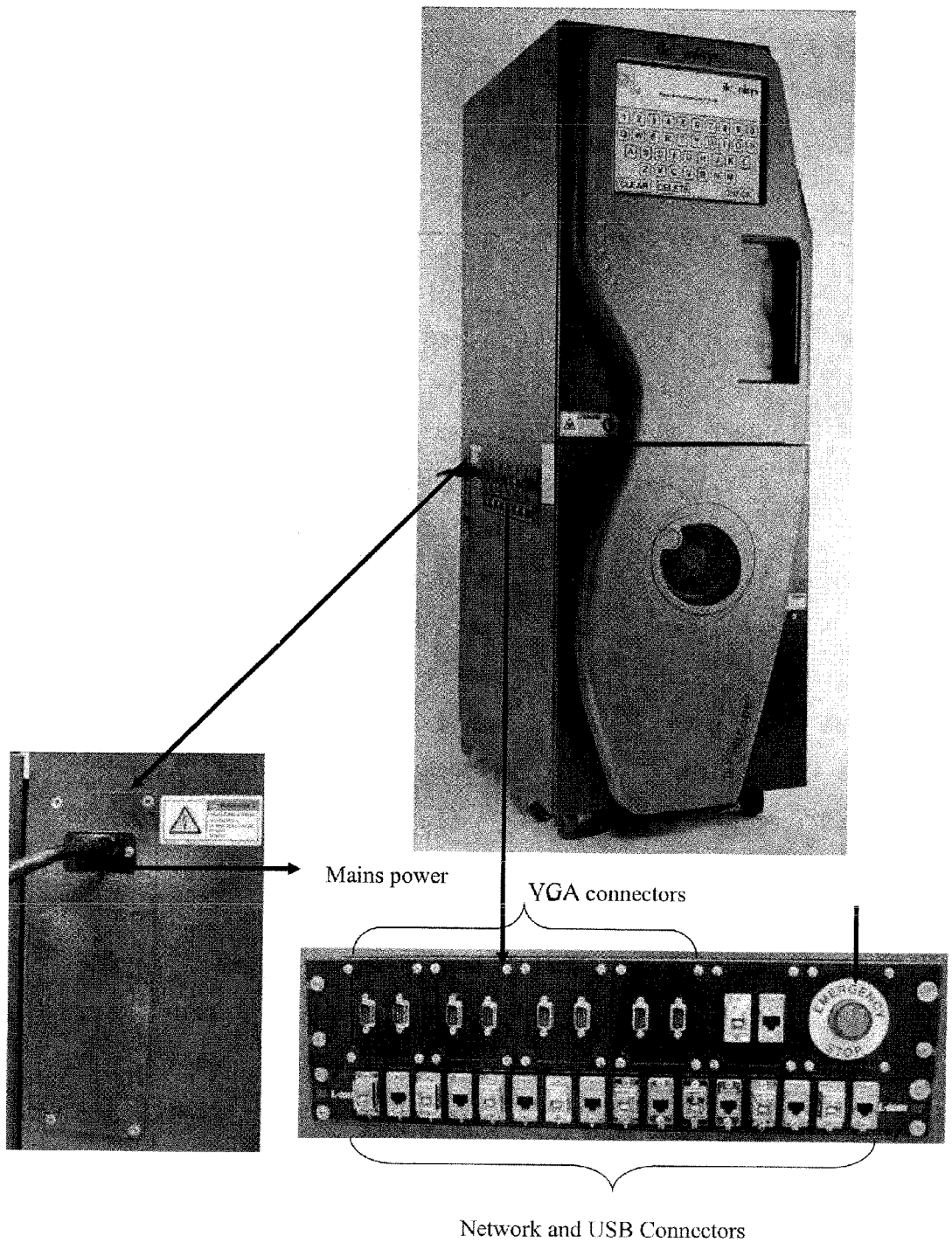
FIG. 23. Perspective view of an embodiment of an enclosure, showing electrical and electronic receptacles.
Figure 24:
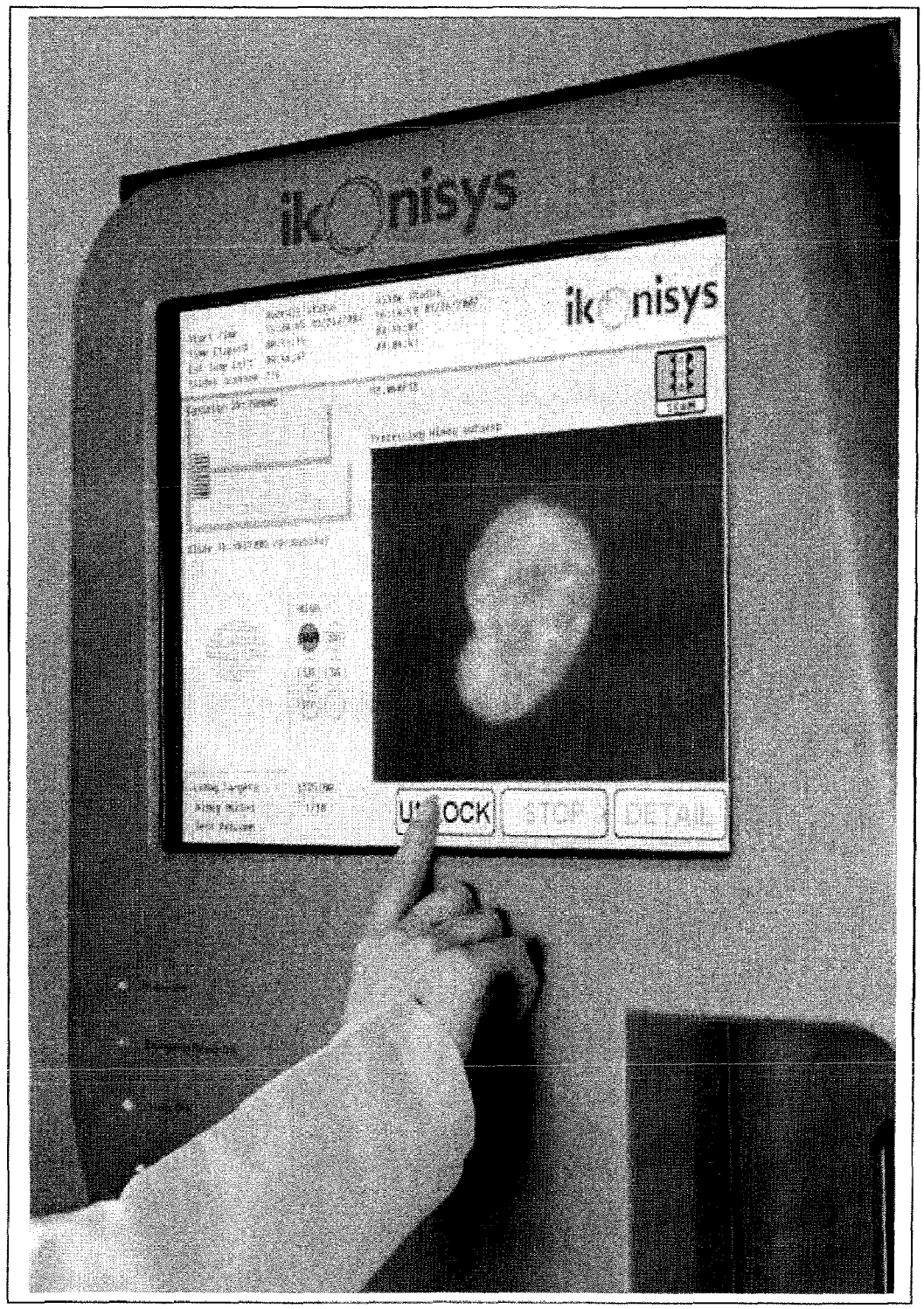
FIG. 24. Partial view of an embodiment of an enclosure showing monitor displaying an image.

In an alternative embodiment, a two-compartment light-tight enclosure is shown in FIG. 20, and further represented in FIGS. 21-24. The embodiment of FIG. 20 includes two compartments stacked vertically on top of one another. As seen in FIG. 20, the lower compartment has mounted to its lower exterior surface a set of Casters to permit ease of displacement of the entire enclosure about a surface, such as a floor of an environment, or platform of an experimental system. A Lower Compartment includes an opening in the front door of the compartment for a Front cooling fan. In this embodiment, an Upper Compartment includes a conveniently located, large Display/Touch Screen, on which instructions to operate various components of an automated robotic microscope system contained within the enclosure, and on which images obtained by an image capture device may be displayed. A representation of such a captured image is shown in FIG. 24. The upper compartment further includes a Slideable cassette door for the introduction or withdrawal of slide cassettes containing a plurality of specimen slides.

Figure 21:
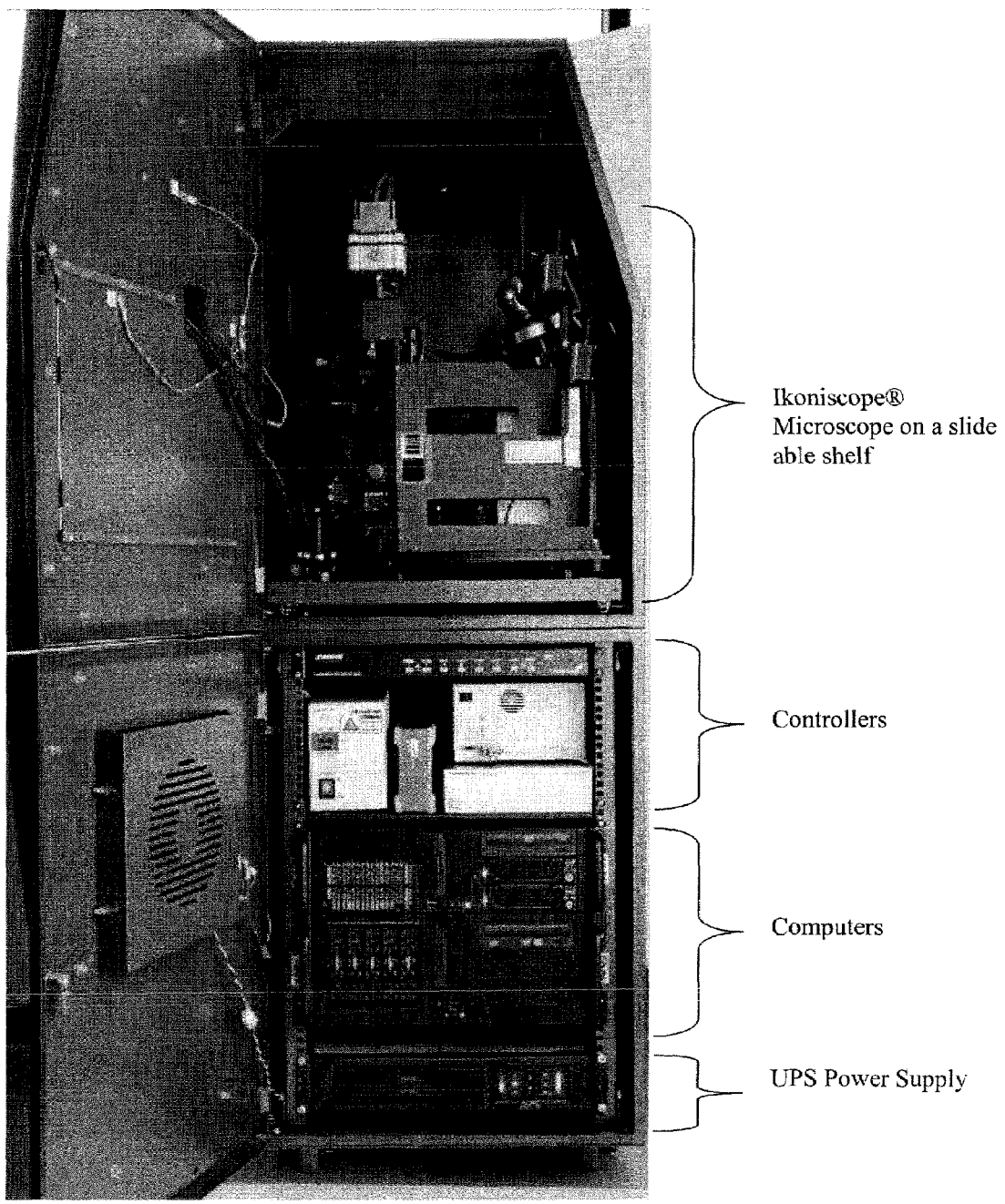
FIG. 21. View of the interior of an embodiment of an enclosure showing an automated microscope assembly and associated electronic and computer components.

An embodiment of a light-tight enclosure is shown in FIG. 21, also representing two compartments stacked one on top of another. The compartments have doors, shown opened in FIG. 21, permitting access to the interiors thereof. The upper compartment is shown to include an automated robotic microscope on a slideable shelf. The lower compartment is shown to contain various electrical and electronic components, including Controllers, Computers, and a UPS Power Supply.

An embodiment of a light-tight enclosure is shown from a different aspect in FIG. 22, also showing two vertically stacked compartments. The upper compartment includes a cut-out space that is a Housing to isolate lamp house from the inside of the upper cabinet. Within this housing, accessible from the exterior of the light-tight enclosure, there is a Lamp access door, as well as a Lamp house. These two components permit convenient observation and maintenance of the microscope light source. At lower compartment shown in FIG. 22, openings for Fans are included.

A perspective view of an embodiment of a light-tight enclosure is shown in FIG. 23. On a side surface of the enclosure, at the lower compartment shown in the Figure, there are panels for various electrical and electronic receptacles that communicate with various power supply, electronic and computer components within the compartment. These include receptacles for Mains power, VGA connectors, and Network and USB connectors.

Various uses for an integrated microscope system provided herein are comtemplated. The system is completely self-contained, and is displaceable in a laboratory setting, along a floor, or a on the surface of a platform or working table, to suit the requirements of the local environment. Nevertheless, in view of the receptacles for various electrical and electronic components, including those that interface with external display and computational facilities, the system of the present invention is highly versatile to accomplish a wide range of experimental or diagnostic protocols. Inclusion of a slide cassette and the ability to instruct operation of the slide cassette via a computer or similar digital control device, high throughput experimental or diagnostic screening is feasible. In use, embodiments of a method of capturing and displaying an image of a specimen on a specimen slide are offered by the systems of the invention. These methods an integrated microscope system displaceable along a second surface comprising an automated robotic microscope system housed in a light-tight enclosure, as disclosed herein. The robotic microscope system can be located in any suitable position on a working surface of a research or service facility. A single slide, or a plurality of slides are prepared from a biological, diagnostic or surgical sample that is to be examined. Such preparation may include procedures as sectioning, slicing, fixing, staining, exposed to fluorescent labels including those that target specific components via fluorescent in situ hybridization, and similar procedures known to workers of skill in the field of the invention. In various embodiments, the slides are further provided with readable labels identifying attributes of the preparation, including an indication of a particular experimental protocol to follow for microscopic analysis.

The slide or slides are placed into a slide cassette, which is then introduced into the automated robotic microscope system through a cassette door provided in a compartment of the light-tight enclosure. The cassette is instructed to reversibly transport a particular slide on the stage of the microscope. The slide is then illuminated with light that is appropriate for the analysis being conducted, including setting of suitable incident light characteristics appropriate for the particular slide preparation protocol that was followed. This may include introduction of an appropriate filter in the light beam of the incident light.

The image capture device registers an image of the slide, and if necessary interacts with computer-resident algorithms to optimize the image that is captured. This may include assessing a particular portion of a specimen on a slide that presents the optimal image for analysis, as well as optimizing an exposure or intensity level to provide an image that is as useful as possible The captured and optimized image is then displayed on the external monitor of the integrated microscope system, and furthermore may be stored or recorded within a computer of the system for further analysis, as well as transmitted externally to other rendering modalities, or to other computational facilities, for further analysis.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims.

We claim:

1. A light-tight enclosure displaceable along a surface for housing an automated robotic microscope having electronically controllable components and an image capture device, comprising:
   (a) at least one compartment, wherein a lowest exterior surface of a lower compartment has rotatable means affixed thereto for displacement about the surface;
   (b) at least one shelf interior to said enclosure, wherein said automated robotic microscope system is positionable on a shelf;
   (c) a viewing monitor disposed in a surface of said enclosure viewable from a location exterior to said enclosure; and
   (d) a plurality of receptacles mounted in a surface of said enclosure that transmit electrical power or electronic signals between an exterior surface and an interior surface of said enclosure.

2. The light-tight enclosure described in claim 1 wherein said compartment has an openable door allowing access from the exterior to the interior of the compartment.

3. The light-tight enclosure described in claim 1 wherein a shelf that supports said automated robotic microscope is mounted on vibration-isolating means.

4. The light-tight enclosure described in claim 1 wherein a shelf is slidably and reversibly retractable from said enclosure.

5. The light-tight enclosure described in claim 1 wherein said viewing monitor displays an image from said image capture device.

6. The light-tight enclosure described in claim 1 wherein said viewing monitor comprises a touch-sensitive screen.

7. The light-tight enclosure described in claim 6 wherein said viewing monitor displays a touch-activatable keyboard.

8. The light-tight enclosure described in claim 7 wherein a keystroke entered on said keyboard communicates with a component of said microscope.

9. The light-tight enclosure described in claim 1 wherein a compartment comprises a fan disposed at a fan vent in a surface of said compartment.

10. An integrated microscope system displaceable along a second surface comprising an automated robotic microscope system housed in a light-tight enclosure, wherein
    (a) said automated robotic microscope system comprises:
       (i) a microscope having a stage;
       (ii) at least one specimen slide positionable on said stage;
       a light source that illuminates said slide;
       (iii) an image capture device that captures an image of said specimen;
       (iv) electrical, electronic and/or computer-driven means communicating with and controlling positioning of said specimen slide, said light source, and said image capture device; and wherein
    (b) said light-tight enclosure comprises:
       (i) at least one compartment, wherein a lowest exterior surface of a lower compartment has rotatable means affixed thereto for displacement about the second surface;
       (ii) at least one shelf interior to said enclosure, wherein said automated robotic microscope system is positioned on a shelf;
       (iii) a viewing monitor disposed in a surface of said enclosure viewable from a location exterior to said enclosure; and
       (iv) a plurality of receptacles mounted in a surface of said enclosure and connected to components of said automated robotic microscope that transmit electrical power or electronic signals between an exterior surface and an interior surface of said enclosure.

11. The integrated microscope system described in claim 10 wherein said at least one specimen slide is contained in a slide cassette.

12. The integrated microscope system described in claim 11 wherein a slide transporting means reversibly transports a selected slide from said slide cassette and positions the slide on said stage.

13. The integrated microscope system described in claim 11 wherein said slide cassette is operated by said electrical, electronic and/or computer-driven means.

14. The integrated microscope system described in claim 10 wherein said light source comprises a filter reversibly positionable to modulate a light beam illuminating said slide.

15. The integrated microscope system described in claim 14 wherein said electrical, electronic and/or computer-driven means reversibly positions said filter for modulating said light beam.

16. The integrated microscope system described in claim 10 wherein said image capture device comprises a camera.

17. The integrated microscope system described in claim 10 wherein said image capture device comprises a digital imaging device.

18. The integrated microscope system described in claim 10 wherein said electrical, electronic and/or computer-driven means controls said image capture device.

19. The integrated microscope system described in claim 10 wherein said compartment has an openable door allowing access from the exterior to the interior of the compartment.

20. The integrated microscope system described in claim 10 wherein a shelf that supports said automated robotic microscope is mounted on vibration-isolating means.

21. The integrated microscope system described in claim 10 wherein a shelf is slidably and reversibly retractable from said enclosure.

22. The integrated microscope system described in claim 10 wherein said viewing monitor is electrically connected to said image capture device.

23. The integrated microscope system described in claim 10 wherein said viewing monitor is electrically connected to said image capture device and displays an image therefrom.

24. The integrated microscope system described in claim 10 wherein said viewing monitor comprises a touch-sensitive screen.

25. The integrated microscope system described in claim 24 wherein said viewing monitor displays a touch-activatable keyboard.

26. The integrated microscope system described in claim 25 wherein a keystroke entered on said keyboard communicates with a component of said microscope.

27. A method of capturing and displaying an image of a specimen on a specimen slide comprising:
 (a) providing an integrated microscope system displaceable along a second surface comprising an automated robotic microscope system housed in a light-tight enclosure, wherein
  (i) said automated robotic microscope system comprises:
   (1) a microscope having a stage;
   (2) at least one specimen slide positionable on said stage;
   (3) a light source that illuminates said slide;
   (4) an image capture device that captures an image of said specimen; and
   (5) electrical, electronic and/or computer-driven means communicating with and controlling positioning of said specimen slide, said light source, and said image capture device; and wherein
  (ii) said light-tight enclosure comprises
   (1) at least one compartment, wherein a lowest exterior surface of a lower compartment has rotatable means affixed thereto for displacement about the surface;
   (2) at least one shelf interior to said enclosure, wherein said automated robotic microscope system is positioned on a shelf,
   (3) a viewing monitor disposed in a surface of said enclosure viewable from a location exterior to said enclosure; and
   (4) a plurality of receptacles mounted in a surface of said enclosure and connected to components of said automated robotic microscope that transmit electrical power or electronic signals between an exterior surface and an interior surface of said enclosure;
 (b) displacing said robotic microscope system to a suitable position about said second surface;
 (c) causing a specimen slide to be reversibly positioned on said microscope stage;
 (d) illuminating said specimen slide;
 (e) capturing said image of said specimen slide; and
 (f) displaying said image on said monitor.

* * * * *